US012596099B2

(12) United States Patent
Ikuta et al.

(10) Patent No.: US 12,596,099 B2
(45) Date of Patent: Apr. 7, 2026

(54) DETECTOR

(71) Applicant: Sharp Display Technology Corporation, Kameyama City (JP)

(72) Inventors: Kei Ikuta, Kameyama City (JP); Tomohiro Kosaka, Kameyama City (JP); Yuuki Ootsuka, Kameyama City (JP); Reshan Maduka Abeysinghe, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 359 days.

(21) Appl. No.: 18/222,510

(22) Filed: Jul. 17, 2023

(65) Prior Publication Data

US 2024/0027398 A1 Jan. 25, 2024

(30) Foreign Application Priority Data

Jul. 22, 2022 (JP) ................................. 2022-116971

(51) Int. Cl.
*G01N 27/624* (2021.01)
*H01J 49/10* (2006.01)
(52) U.S. Cl.
CPC ............ *G01N 27/624* (2013.01); *H01J 49/10* (2013.01)
(58) Field of Classification Search
CPC . G01N 27/624; G01N 27/622; H01J 49/0018; H01J 49/066; H01F 27/28; H01F 27/255; H01F 19/04
See application file for complete search history.

(56) References Cited

U.S. PATENT DOCUMENTS

| | | | | |
|---|---|---|---|---|
| 6,512,224 B1* | 1/2003 | Miller | ................. | G01N 27/624 |
| | | | | 250/286 |
| 2015/0129755 A1* | 5/2015 | Hiley | ................. | G01N 27/622 |
| | | | | 250/281 |
| 2016/0380621 A1 | 12/2016 | Hiley | | |

FOREIGN PATENT DOCUMENTS

JP 2015-524164 A 8/2015

* cited by examiner

*Primary Examiner* — David E Smith
*Assistant Examiner* — Hsien C Tsai
(74) *Attorney, Agent, or Firm* — ScienBiziP, P.C.

(57) ABSTRACT

A detector includes a first electrode, a second electrode facing the first electrode with a space and forming a flow path for charged particles as objects to be detected between the first electrode and the second electrode, a third electrode arranged side by side with the second electrode on a downstream side in the flow path with respect to the second electrode and configured to collect the charged particles, and a potential supply circuit configured to supply a potential to at least one of the first electrode and the second electrode, in which the potential supply circuit includes a first inductor including a first input portion and a first output portion, and a second inductor including a second input portion and a second output portion, the first input portion of the first inductor is connected to a DC power supply, and the second input portion of the second inductor is connected to the first electrode or the second electrode.

8 Claims, 21 Drawing Sheets

1

64

DETECTOR

CROSS-REFERENCE TO RELATED APPLICATIONS

This application claims the benefit of priority to Japanese Patent Application Number 2022-116971 filed on Jul. 22, 2022. The entire contents of the above-identified application are hereby incorporated by reference.

BACKGROUND

Technical Field

The techniques disclosed in the present specification relate to a detector.

A radio frequency (RF) generator applied to a detector using a field asymmetric ion mobility spectrometry (FAIMS) system is known, as described in JP 2015-524164 T. The radio frequency generator described in JP 2015-524164 T includes an active device that drives a series resonant circuit. The series resonant circuit includes a self-resonant dual inductor. The radio frequency generator may be used to drive a capacitive load.

SUMMARY

Output of the series resonant circuit of the radio frequency generator described in JP 2015-524164 T is directly connected to the capacitive load of the detector using the field asymmetric ion mobility spectrometry. Thus, when load fluctuations occur in the detector, potential fluctuations occur in the series resonant circuit, making stable detection difficult.

The techniques described in this specification have been created based on the above-described circumstances, and achieve stable detection.

(1) A detector related to the techniques described in this specification includes a first electrode, a second electrode facing the first electrode with a space and forming a flow path for charged particles as objects to be detected between the first electrode and the second electrode, a third electrode arranged side by side with the second electrode on a downstream side in the flow path with respect to the second electrode and configured to collect the charged particles, and a potential supply circuit configured to supply a potential to at least one of the first electrode and the second electrode, in which the potential supply circuit includes a first inductor including a first input portion and a first output portion, and a second inductor including a second input portion and a second output portion, the first input portion of the first inductor is connected to a DC power supply, and the second input portion of the second inductor is connected to the first electrode or the second electrode.

(2) In addition to (1), in the detector, the potential supply circuit may include a transistor and a resonant circuit, the transistor may include a gate electrode, a source electrode, and a drain electrode, the gate electrode may be connected to a PWM signal supply section configured to generate a PWM signal, and the drain electrode and the resonant circuit may be connected in parallel with respect to the first output portion.

(3) In addition to (2), in the detector, the second input portion of the second inductor may be connected to the first electrode.

(4) In addition to (3), in the detector, the second input portion and the first electrode may be connected in parallel with respect to a first compensation potential supply section configured to generate a first compensation potential.

(5) In addition to (2), the detector may include a third inductor including a third input portion and a third output portion, and a core having an annular shape around which the first inductor, the second inductor, and the third inductor are wound, in which a winding direction of the second inductor with respect to the core from the second input portion to the second output portion may be the same as a winding direction of the third inductor with respect to the core from the third output portion to the third input portion, the second input portion of the second inductor may be connected to the first electrode, and the third input portion of the third inductor may be connected to the second electrode.

(6) In addition to (5), in the detector, the second input portion and the first electrode may be connected in parallel with respect to a second compensation potential supply section configured to generate a second compensation potential, and the third input portion and the second electrode may be connected in parallel with respect to a third compensation potential supply section configured to generate a third compensation potential.

(7) In addition to (2), in the detector, the second input portion of the second inductor may be connected to the first electrode, and the second electrode may be connected in parallel to the drain electrode and the resonant circuit with respect to the first output portion.

(8) In addition to (7), in the detector, the second input portion and the first electrode may be connected in parallel with respect to a fourth compensation potential supply section configured to generate a fourth compensation potential, and the second electrode may be connected to a fifth compensation potential supply section configured to generate a fifth compensation potential.

The techniques described in the present specification achieve stable detection.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIG. 1 to FIG. 10. In the present embodiment, a mobility analyzer 1 (hereinafter simply referred to as "analyzer") using a field asymmetric ion mobility spectrometry (FAIMS) system is illustrated.

Figure 1:
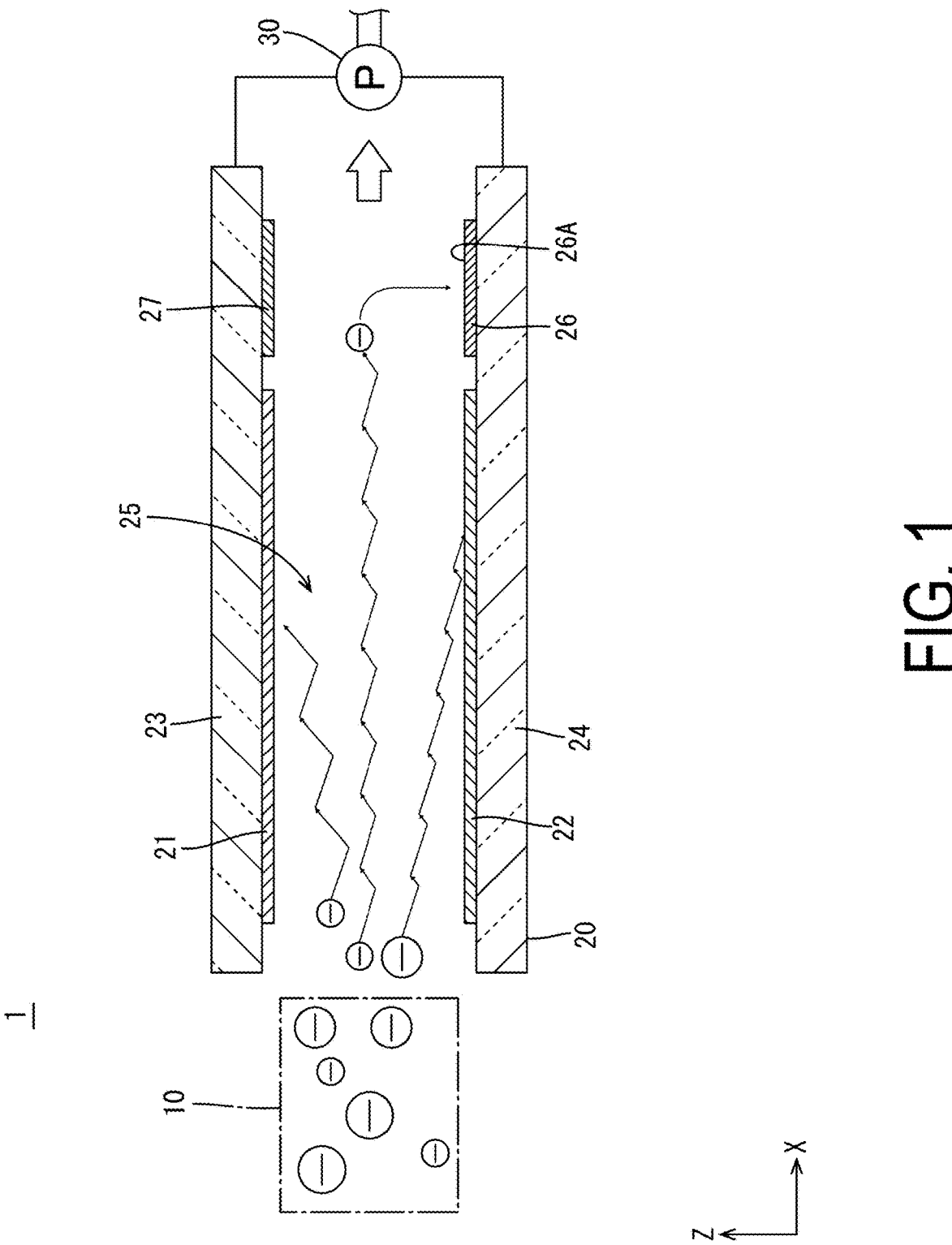
FIG. 1 is a schematic diagram illustrating a configuration of a mobility analyzer including a detector according to a first embodiment.

As illustrated in FIG. 1, the analyzer 1 includes an ionization source 10, a detection cell 20, a pump 30 (an example of an air supply device), and a control unit 40. A detector 50 disclosed herein includes at least the detection cell 20 and the control unit 40 of the analyzer 1 (see FIG. 4). Components are each described below.

The ionization source 10 is a device that ionizes atoms and molecules of a compound (sample) to be analyzed. When the compound is ionized by the ionization source 10, the ionized compound becomes a charged particle (sample ion) detectable in the detection cell 20. The charged particle is an object to be detected by the detector 50. An ionization method employed by the ionization source 10 is not limited, and any of various existing ionization sources can be used. To be specific, the ionization methods include, for example, an electron impact (EI) method, a chemical ionization method, a gas discharge method, a photoionization method, a desorption ionization method, an electrospray ionization (ESI) method, a thermal ionization method, an ambient ionization method, and a combination thereof. An ionization source capable of ionizing a component to be detected may be appropriately selected. In this example, although not specifically illustrated, a needle electrode is provided as the ionization source 10. The needle electrode generates a corona discharge under atmospheric pressure to generate reactive ions. The reactive ions indirectly generate charged particles by reacting with sample atoms and sample molecules. The charged particles are not limited to ions to be analyzed, but may be reactant ions, ion clusters, or the like.

Examples of the ionization source 10 include, in addition to the needle electrode described above, an ionization unit that includes a radioactive ion source containing a nickel isotope ($^{63}$Ni), an americium isotope ($^{241}$Am), or the like and ionizes a sample generated from the radioactive ion source, and an ionization unit that includes an ultraviolet pulsed laser oscillator and irradiates an ultraviolet pulsed laser beam to directly ablate and ionize a sample. The charged particles generated by the ionization source 10 are carried into the detection cell 20 by an air flow generated by supplying an atmospheric gas (neutral buffer gas), such as air or a carrier gas, by the pump 30, which will be described later.

The pump 30 is a component for moving the atmospheric gas containing the charged particles into the detection cell 20 along a flow direction. The pump 30 of the present embodiment is installed downstream of the detection cell 20 in the flow direction. As the pump 30, any of various air supply devices that can supply the charged particles generated by the ionization source 10 into the detection cell 20, which will be described later, at a predetermined speed can be used. An air supply mechanism of the pump 30 is not limited, and may be a diaphragm type, an impeller type, a piston type, a rotary vane type, another air supply device, or the like. Depending on a size or the like of the detection cell 20, as the pump 30, for example, a micro-blower with a maximum discharge pressure of about 0.03 MPa or less and an air supply rate of about 1 L/min or less can be used. For example, a micro-blower in which a diaphragm is fluctuated due to high frequency vibration (e.g., ultrasonic vibration) generated by piezoelectric ceramics is preferable as the pump 30 used in the present embodiment because it can supply air while suppressing pulsation.

The detection cell 20 is a component that separates (filters) charged particles generated by the ionization source 10 based on a difference in mobility, thereby detecting charged particles for each predetermined mobility. The detection cell 20 includes a first electrode 21, a second electrode 22, a first substrate 23 (an example of a support body), a second substrate 24 (an example of a support body), a detection electrode 26, and a deflection electrode 27. All of these elements of the detection cell 20 may be disposed in a chamber.

The first electrode 21 and the second electrode 22 are disposed to face each other to form a pair of parallel plate filter electrodes. Main surfaces of the first electrode 21 and the second electrode 22 facing each other are parallel. A predetermined distance is kept between the first electrode 21 and the second electrode 22. A flow path 25 for charged particles is formed between the first electrode 21 and the second electrode 22. Hereinafter, a direction (main direction) in which charged particles flow in the flow path 25 is referred to as "flow direction". The flow path 25 includes an ion separation space (drift space). The first electrode 21 and the second electrode 22 of this example are respectively provided on surfaces of the first substrate 23 and the second substrate 24, which will be described later, facing each other.

Shapes, sizes, and the like of the first electrode 21 and the second electrode 22 are not limited. The first electrode 21 and the second electrode 22 of this example each have rectangular shapes that are slightly long in the flow direction. Dimensions of the first electrode 21 and second electrode 22 along the flow direction of the charged particles are not limited to this, but may be, for example, about 0.1 cm or more (such as 1 cm or more) and about 50 cm or less (such as 10 cm or less). Thicknesses of the first electrode 21 and the second electrode 22 are not limited, and may be independently set as appropriate in a range of about 50 nm or more and 1 μm or less, for example. The thicknesses of the first electrode 21 and the second electrode 22 may be typically 600 nm or less, such as 400 nm or less, and typically 100 nm or more, such as 200 nm or more.

Figure 2:
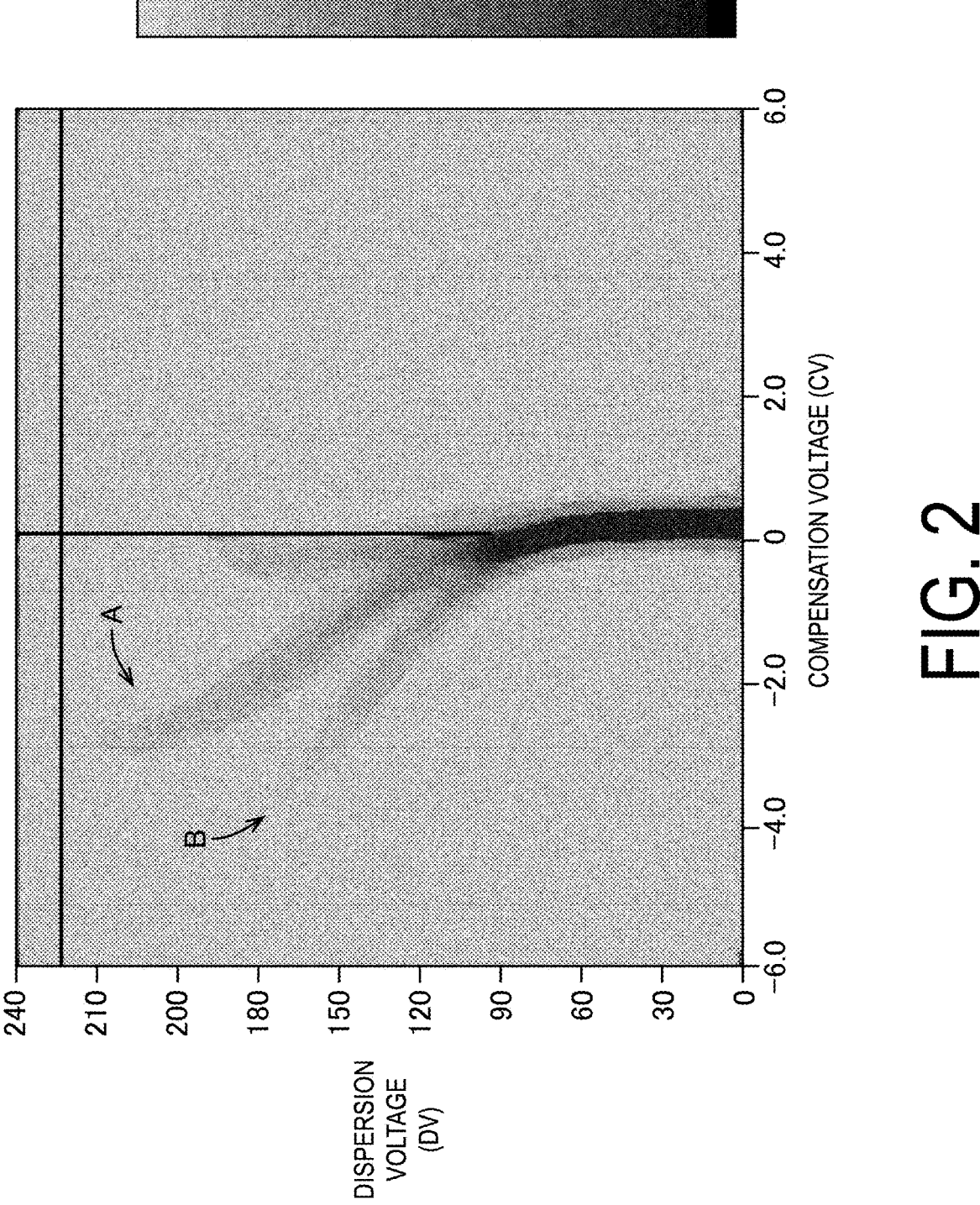
FIG. 2 is a heat map illustrating a relationship between the number of sample ions measured by the mobility analyzer and analysis conditions.
Figure 3:
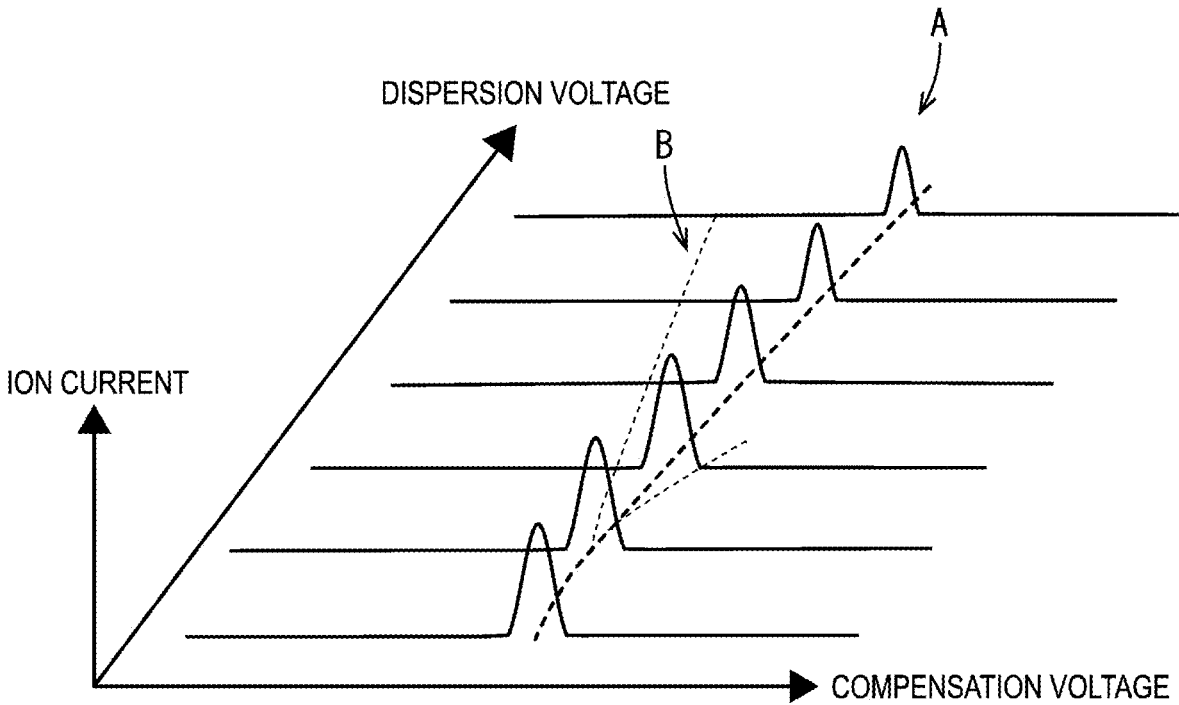
FIG. 3 is a graph schematically illustrating the heat map in FIG. 2.

A distance (filter gap) between the first electrode 21 and the second electrode 22 is not strictly limited. Narrowing the filter gap is preferable because field intensity formed in the ion separation space (corresponding to a dispersion voltage described later) can be effectively increased. For example, FIGS. 2 and 3 are a map graph and a schematic diagram of main portions thereof that illustrate a relationship between analysis conditions (a compensation voltage and the dispersion voltage to be described later) and the number of sample ions (ion current) detected under the analysis conditions in an analysis of one analyte using the analyzer 1. In the graph in FIG. 2, the analysis conditions are indicated by darker colors as more sample ions are detected. As shown in FIG. 2, the analyte contains two components A and B, in addition to a carrier gas component, as indicated by arrows in the figure. Even when analyzing the same analyte, the number of sample ions detected differs depending on the analysis conditions. In general, the higher the field intensity, the better the separation of components contained in one analyte. However, the more the components are separated, the lower the concentration of charged particles that can be detected under the relevant analysis conditions, making detection of charged particles more difficult. When the filter gap is too narrow, there is a trade-off that discharge and air flow turbulence are likely to occur between the first electrode 21 and the second electrode 22. Thus, the filter gap may be, for example, about 30 μm or more (typically, 50 μm or more) and, for example, about 500 μm or less (typically, 300 μm or less).

A material for the first electrode 21 and the second electrode 22 is not limited. The material for the first electrode 21 and the second electrode 22 may be any of various conductive materials capable of generating an electrical field, which will be described later, between the electrodes 21 and 22, and may be a metal material, an inorganic conductive material, or an organic conductive material. When a sample to be detected and ions thereof are considered to be metal corrosive, either the inorganic conductive material or the organic conductive material may be used as the conductive material for surfaces of the first electrode 21 and the second electrode 22. The metal material for the first electrode 21 and the second electrode 22 is not limited. For example, when the first electrode 21 and the second electrode 22 are fabricated by a lithography technique using an ArF excimer laser, the first electrode 21 and the second electrode 22 may be made of one metal selected from highly conductive metals such as gold (Au), copper (Cu), titanium (Ti), aluminum (Al), chromium (Cr), molybdenum (Mo), tantalum (Ta), tungsten (W), and alloys of these metals, alloys containing two or more of these metals, and the like. Among these metal materials, for example, W/Ta, Ti/Al, Ti/Al/Ti, Cu/Ti, or the like may be layered in order from an upper layer side, thereby enhancing physical properties such as adhesion to underlayers (typically, the first substrate 23 and the second substrate 24). Examples of inorganic conductive materials include indium tin oxide (ITO), indium zinc oxide (IZO), indium gallium zinc oxide (IGZO), and ZnO. Examples of organic conductive materials include polyacetylene and polythiophenes. The first electrode 21 and the second electrode 22 may have layered structures of two or more of a metal material, an inorganic conductive material, and an organic conductive material.

The first substrate 23 is a component that supports the first electrode 21. In the present embodiment, as illustrated in FIG. 1, the first electrode 21 and the deflection electrode 27 are provided on the first substrate 23 at positions separated in the flow direction. The second substrate 24 is a component that supports the second electrode 22. In the present embodiment, the second electrode 22 and the detection electrode 26 are provided on the second substrate 24 at positions separated in the flow direction. The first substrate 23 and the second substrate 24 are disposed such that main surfaces (examples of support surfaces) on which the electrodes 21 and 27, and the electrodes 22 and 26 are provided face each other. Both the first substrate 23 and the second substrate 24 are long rectangular flat plates. An air supply direction of the pump 30 (moving direction of charged particles) in the flow path 25 coincides with longitudinal directions of the first substrate 23 and the second substrate 24. The first electrode 21 and the second electrode 22 are disposed on an upstream side in the air supply direction, while the deflection electrode 27 and the detection electrode 26 are disposed on a downstream side in the air supply direction. Specific shapes of the first substrate 23 and the second substrate 24 are not limited as long as they can support the first electrode 21 and the second electrode 22, and the deflection electrode 27 and the detection electrode 26 in parallel with a predetermined gap. For example, the first substrate 23 and the second substrate 24 may be tubular (e.g., square tubular or tubular) as a single component.

The first substrate 23 and the second substrate 24 of the present embodiment can be made of any of various insulating materials having electrical insulating properties. Examples of insulating materials include materials having a volume resistivity of $10^7$ Ωcm or more (e.g., $10^{10}$ Ωcm or more, $10^{12}$ Ωcm or more, or $10^{15}$ Ωcm or more) at room temperature (e.g., 25° C.), such as organic materials and inorganic materials having the above volume resistivity. Although not limited thereto, in the present embodiment, flat glass substrates are used as the first substrate 23 and the second substrate 24 from the viewpoint that the electrodes can be suitably formed by a lithography technique. Thicknesses of the first substrate 23 and the second substrate 24 are not limited, but may be, for example, about 0.1 to 1 mm (such as 0.5 mm or 0.7 mm).

The detection electrode 26 is a component that receives charges of charged particles introduced into the detection cell 20 when the charged particles come into contact with the detection electrode 26. The detection electrode 26 is a third electrode arranged side by side with the second electrode 22 on the downstream side in the flow path 25. The detection electrode 26 has a collecting surface 26A that receives charged particles. The detection electrode 26 is connected to the control unit 40. With such a configuration, the control unit 40 can count the number of charged particles that the detection electrode 26 has received on the collecting surface 26A.

The deflection electrode 27 is a component for deflecting the charged particles introduced into the detection cell 20 toward the detection electrode 26 so that the detection electrode 26 collects the charged particles. The deflection electrode 27 is a fourth electrode arranged side by side with the first electrode 21 on the downstream side in the flow path 25. The deflection electrode 27 is placed so as to face the detection electrode 26. The deflection electrode 27 is connected to a second potential adjustment unit 42, which will be described later. The deflection electrode 27 can form an electrical field between the detection electrode 26 and the deflection electrode 27 that deflects charged particles to the detection electrode 26 by applying a voltage by the second potential adjustment unit 42. A space between the detection electrode 26 and the deflection electrode 27 is a detection space for detecting charged particles that have passed through the ion separation space.

Shapes of the detection electrode 26 and the deflection electrode 27 are not limited. Thicknesses of the detection electrode 26 and the deflection electrode 27 may be, for example, about 1 μm or less, typically 600 nm or less, such as 500 nm or less, 400 nm or less, or 200 nm or less. The thicknesses of the detection electrode 26 and the deflection electrode 27 may each independently be about 10 nm or more, typically 50 nm or more, such as 100 nm or more. A material and structure of the detection electrode 26 and the deflection electrode 27 may be the same as those of the first electrode 21 and the second electrode 22 described above.

Figure 4:
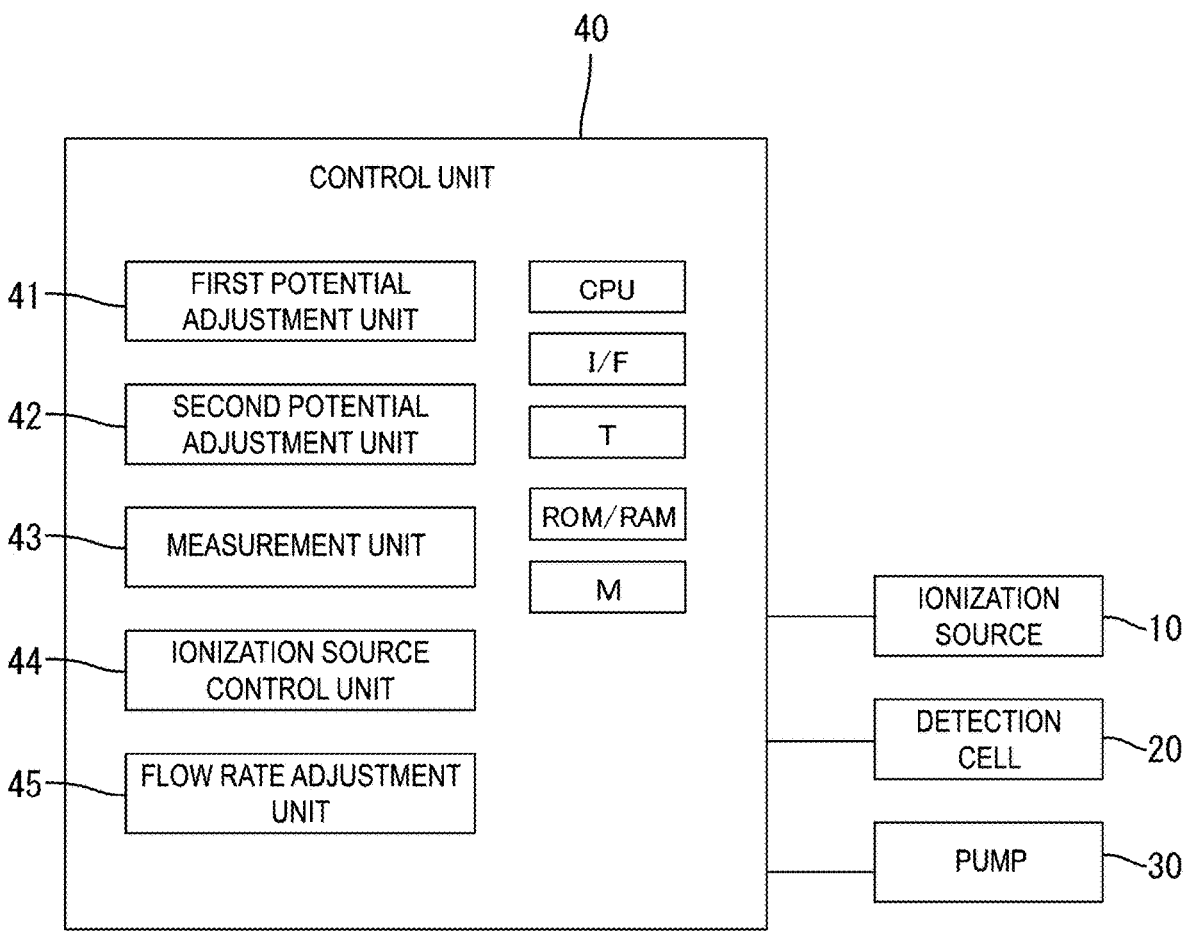
FIG. 4 is a block diagram of a control unit of the mobility analyzer.

The control unit 40 is a component that controls drive of the analyzer 1. As illustrated in FIG. 4, the control unit 40 of the present embodiment is connected to the detection cell 20. To be more specific, the control unit 40 is connected to the first electrode 21, the detection electrode 26, and the deflection electrode 27, and is configured to control operations thereof. The second electrode 22 of the detection cell 20 according to the present embodiment is grounded (connected to ground). The control unit 40 of the present embodiment is additionally connected to the ionization source 10 and the pump 30, and can be connected to an external power supply for supplying power to the analyzer 1.

The control unit 40 is a microcomputer including an interface (I/F) that transmits and receives various kinds of information and the like, a central processing unit (CPU) that executes commands of a control program, a read only memory (ROM) that stores the program that is executed by the CPU, a random access memory (RAM) that is used as a working area for developing the program, a storage unit M that stores various kinds of information, a timer T that has a clocking function, and the like. Although not limited thereto, the ROM may store, for example, computer programs, databases, and data tables used for applying voltages to a first potential adjustment unit 41 and the second potential adjustment unit 42, respectively as well as a computer program, a database, and a table for executing various analysis processes based on the number of detected charged particles. The storage unit M can store, for example, ID information about an analyte to be analyzed, information related to the number of detected charged particles, information used for various analysis processes, information related to analysis results, and the like.

The control unit 40 includes the first potential adjustment unit 41, the second potential adjustment unit 42, a measurement unit 43, an ionization source control unit 44, and a flow rate adjustment unit 45. Each of these units may be independently configured by hardware, or may be functionally implemented by execution of a program by the CPU.

The first potential adjustment unit 41 is an element that adjusts a potential difference that occurs between the first electrode 21 and the second electrode 22. The first potential adjustment unit 41 generates a potential difference (filter voltage) between the first electrode 21 and the second electrode 22, which forms an electrical field between the first electrode 21 and the second electrode 22. Here, ion mobility is constant in a low electrical field regardless of field intensity, but a value of the ion mobility changes depending on the field intensity in a high electrical field. Thus, the first potential adjustment unit 41 typically includes a variable voltage generator such as a pulse voltage generator, and can apply, for example, a dispersion voltage (DV) with a rectangular waveform illustrated in FIG. 5A. The dispersion voltage applied between the first electrode 21 and the second electrode 22 is a bipolar pulse voltage that shows both positive and negative polarities. Potentials in both positive and negative polarities are typically switched asymmetrically with respect to each other. A voltage waveform is an asymmetric pulse waveform that alternately includes a period $T_H$ during which the voltage is at a high voltage level $V_H$ forming a high electrical field and a period $T_L$ during which the voltage is at a low voltage level $V_L$ forming a low electrical field. In this voltage waveform, a time average of the voltage is set to 0.

Figure 5A:
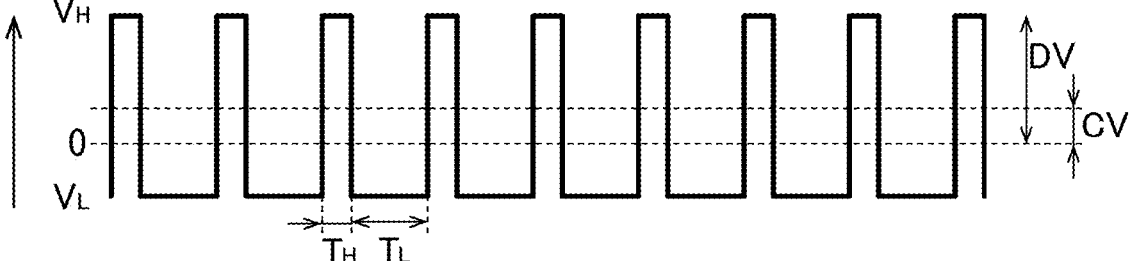
FIG. 5A is a graph illustrating a dispersion voltage applied between first and second electrodes of the detector.
Figure 5B:
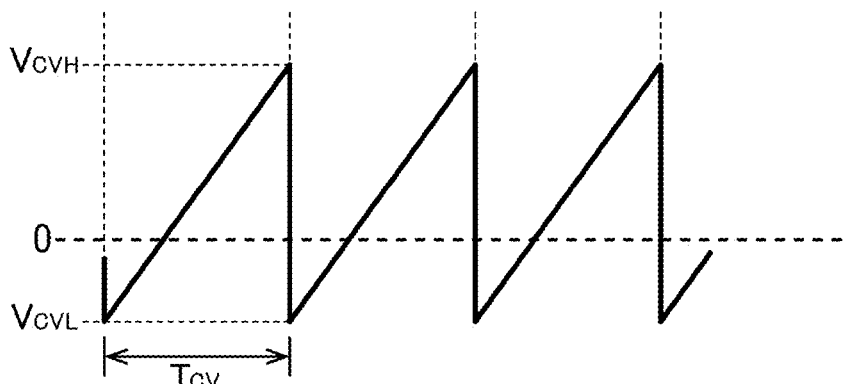
FIG. 5B is a graph illustrating a compensation voltage applied between the first and second electrodes of the detector.

In the ion separation space between the first electrode 21 and the second electrode 22, a flow of a carrier gas (typically neutral) containing charged particles is formed at a constant flow rate by driving the pump 30 with the flow rate adjustment unit 45, which will be described later. Here, when the voltage of the high voltage level $V_H$ is applied by the first potential adjustment unit 41, a high electrical field is formed in the ion separation space. When the voltage of the low voltage level $V_L$ is applied by the first potential adjustment unit 41, a low electrical field is formed in the ion separation space. The high electrical field has a polarity different from that of the low electrical field. When charged particles are sent into an environment in which such mutually asymmetrical electrical fields are alternately generated, the charged particles zigzag so as to be alternately attracted by the first electrode 21 and the second electrode 22. At this time, the charged particles largely deflected by the first electrode 21 or the second electrode 22 hit the first electrode 21 or the second electrode 22 and cannot pass through the flow path 25. Only charged particles balanced between the first electrode 21 and the second electrode 22 pass through the flow path 25 and are sent to the detection electrode 26 located downstream. Ion species passing through the flow path 25 can be changed as follows. That is, the first potential adjustment unit 41 applies, for example, a compensation voltage (CV) illustrated in FIG. 5B superimposed on the dispersion voltage DV, between the first electrode 21 and the second electrode 22 while changing voltage. The compensation voltage CV is a DC voltage. By changing the compensation voltage CV at a constant rate of change and period $T_{CV}$ for each predetermined dispersion voltage DV, ion species having different mobilities can be sequentially sent to the detection space. FIG. 5B illustrates how the compensation voltage CV is changed in a range from a lower limit voltage $V_{CVL}$ to an upper limit voltage $V_{CVH}$ with the period $T_{CV}$.

The second potential adjustment unit 42 is an element that applies a predetermined potential difference between the detection electrode 26 and the deflection electrode 27. The second potential adjustment unit 42 in the present embodiment is connected to the deflection electrode 27, and applies a potential to the deflection electrode 27. When charged particles introduced into the detection cell 20 are positive ions, the second potential adjustment unit 42 adjusts the potential of the deflection electrode 27 such that the potential of the deflection electrode 27 is higher than that of the detection electrode 26. When charged particles introduced into the detection cell 20 are negative ions, the second potential adjustment unit 42 adjusts the potential of the deflection electrode 27 such that the potential of the deflection electrode 27 is lower than that of the detection electrode 26. Thus, the charged particles that have passed through the ion separation space can be deflected toward the detection electrode 26.

The measurement unit 43 is an element that detects the number of charged particles that have reached the detection electrode 26. The measurement unit 43 is connected to the detection electrode 26, and converts a current value based on the number of charged particles that have reached the detection electrode 26 into a voltage value using a transimpedance circuit to acquire the number of ions. The measurement unit 43 may be configured not only to measure the number of charged particles but also to qualify and quantify the charged particles in cooperation with the first potential adjustment unit 41, for example. Information related to the number of charged particles and the like measured by the measurement unit 43 is stored in the storage unit M, for example.

The ionization source control unit 44 is connected to the ionization source 10 and is configured to control an operation of the ionization source 10. The ionization source control unit 44 can switch charged particles to be generated between positive ions and negative ions, for example, by switching a polarity of the voltage applied to the needle electrode in the ionization source 10 between positive and negative. Although not limited thereto, when the ionization source control unit 44 causes the ionization source 10 to generate negative charged particles, the first potential adjustment unit 41 and the second potential adjustment unit 42 adjust the voltages applied to the first electrode 21 and the deflection electrode 27, respectively, so that the negative charged particles can pass through the flow path 25. When the ionization source control unit 44 causes the ionization source 10 to generate positive charged particles, the first potential adjustment unit 41 and the second potential adjustment unit 42 adjust the voltages applied to the first electrode 21 and the deflection electrode 27, respectively, so that the positive charged particles can pass through the flow path 25.

The flow rate adjustment unit 45 is connected to the pump 30 and is configured to control an operation of the pump 30. The flow rate adjustment unit 45 can adjust a flow rate of gas in the detection cell 20 by controlling, for example, timings of driving and stopping the pump 30 and a rotational speed of a fan of the pump 30.

Next, a detailed configuration of the detector 50 will be described. The detector 50 includes at least the first electrode 21, the second electrode 22, and the detection electrode 26, which are constituent elements of the detection cell 20, and the first potential adjustment unit 41, which is a constituent element of the control unit 40. The first electrode 21, the second electrode 22, and the detection electrode 26 are as described above, and the first potential adjustment unit 41 will be described in detail below with reference to FIG. 6.

Figure 6:
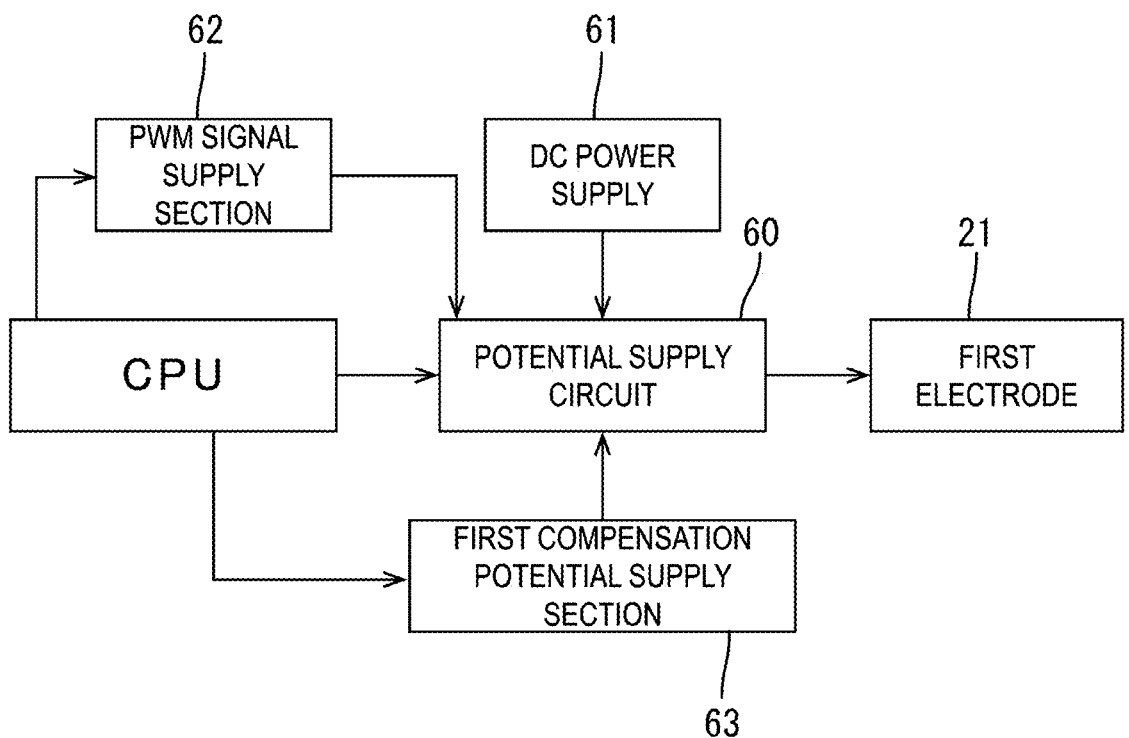
FIG. 6 is a block diagram illustrating an electrical configuration related to a potential supply circuit of the detector.

As illustrated in FIG. 6, the first potential adjustment unit 41, which is a constituent element of the control unit 40, includes a potential supply circuit 60 that supplies a potential to the first electrode 21, as the variable voltage generator described above. The potential supply circuit 60 is controlled by the CPU. A DC power supply 61, a pulse width modulation (PWM) signal supply section 62, and a first compensation potential supply section 63 are connected to the potential supply circuit 60. The DC power supply 61 supplies a DC voltage of, for example, 100 V to the potential supply circuit 60. Both the PWM signal supply section 62 and the first compensation potential supply section 63 are DC power supplies. The PWM signal supply section 62 and the first compensation potential supply section 63 are controlled by the CPU to supply a PWM signal and a first compensation potential to the potential supply circuit 60. The first compensation potential supplied to the potential supply circuit 60 by the first compensation potential supply section 63 corresponds to the compensation voltage CV described above. To be specific, the first compensation potential supply section 63 outputs the first compensation potential changed in a range of ±20 V. Thus, in the present embodiment, the lower limit voltage $V_{CVL}$ (described above)

of the compensation voltage CV is −20 V, and the upper limit voltage $V_{CVH}$ (described above) of the compensation voltage CV is +20 V (see FIG. 5B).

Figure 7:
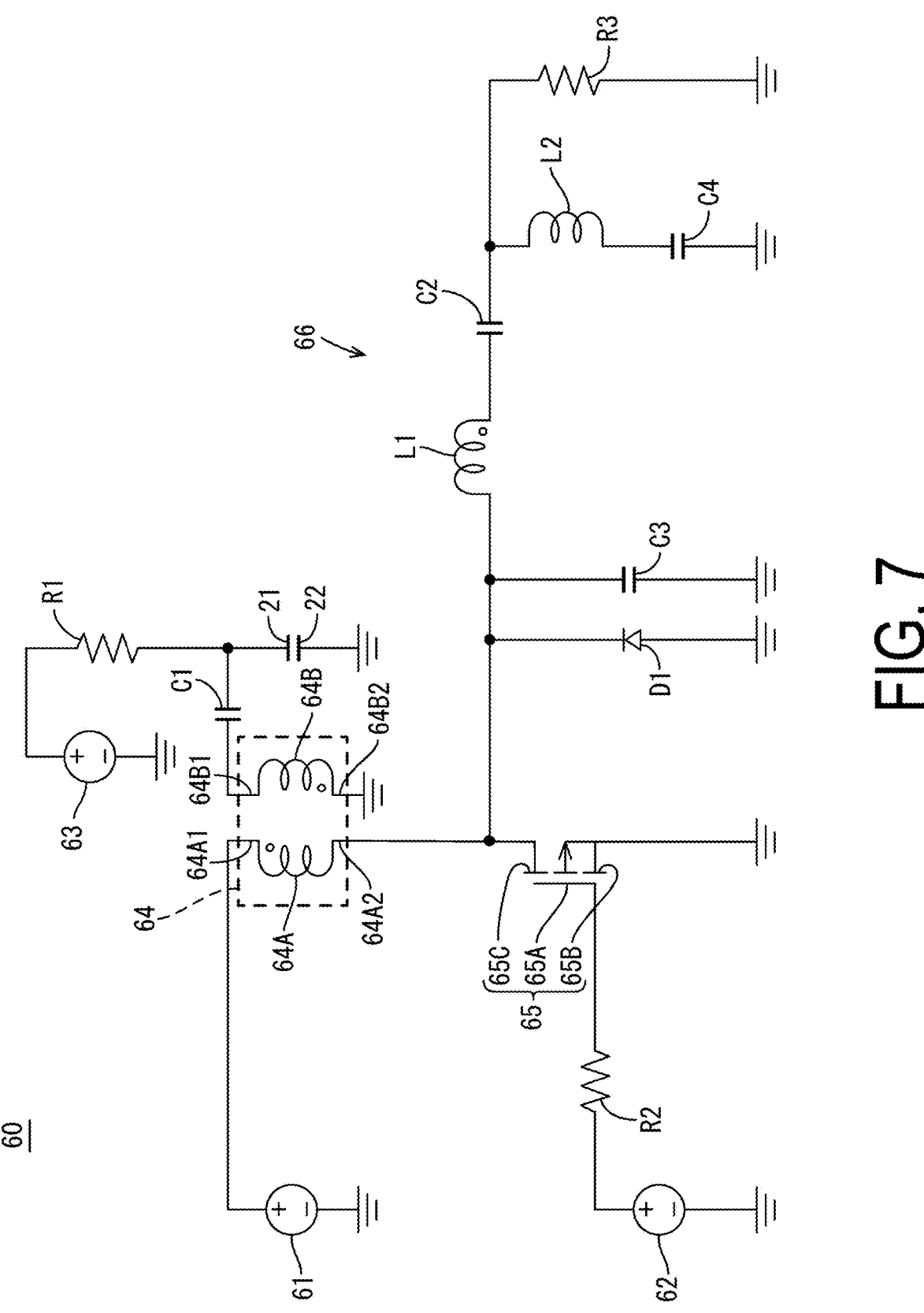
FIG. 7 is a circuit diagram of the potential supply circuit.

As illustrated in FIG. 7, the potential supply circuit 60 includes a dual inductor 64, a transistor 65, and a resonant circuit 66. A part of the dual inductor 64 (a first inductor 64A to be described later), the transistor 65, and the resonant circuit 66 constitute a so-called class E amplifier. That is, it can be said that the potential supply circuit 60 of the present embodiment has a configuration in which the dual inductor 64 is combined with the class E amplifier.

The dual inductor 64 includes the first inductor 64A and a second inductor 64B. The first inductor 64A is formed of a winding, and one end portion thereof is a first input portion 64A1 and the other end portion thereof is a first output portion 64A2. The first input portion 64A1 is connected in series to the DC power supply 61. The first output portion 64A2 is connected in parallel to the transistor 65 and the resonant circuit 66. An inductance of the first inductor 64A is, for example, about 40 pH.

The second inductor 64B is formed of a winding, and one end portion thereof is a second input portion 64B1 and the other end portion thereof is a second output portion 64B2. The second input portion 64B1 is connected in parallel to the first compensation potential supply section 63 and the first electrode 21. The first compensation potential supplied from the first compensation potential supply section 63 to the first electrode 21 is the compensation voltage CV illustrated in FIG. 5B. The second output portion 64B2 is grounded. A capacitor C1 is connected in series to the second input portion 64B1. An electrostatic capacitance of the capacitor C1 is, for example, about 10 nF. A resistor R1 is connected in series to the first compensation potential supply section 63. A resistance value of the resistor R1 is, for example, about 10 kΩ. An inductance of the second inductor 64B is the same as the inductance of the first inductor 64A and is, for example, about 40 μH. Between the first electrode 21 connected to the second input portion 64B1 via the capacitor C1 and the second electrode 22 that is grounded, an electrostatic capacitance of about 20 pF, for example, is formed.

Figure 8:
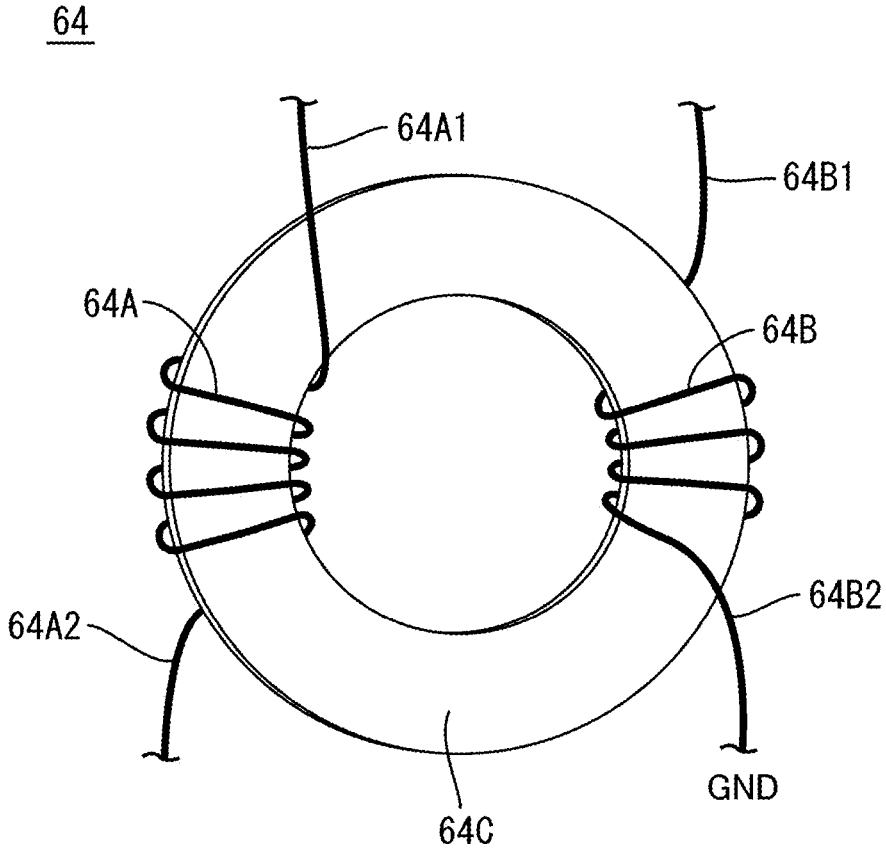
FIG. 8 is a plan view illustrating a schematic configuration of a dual inductor.

As illustrated in FIG. 8, the dual inductor 64 includes a core 64C around which the first inductor 64A and the second inductor 64B are wound. The core 64C is made of a magnetic material such as permalloy or ferrite. The core 64C has an annular shape. The first inductor 64A and the second inductor 64B are wound around the core 64C. The first inductor 64A and the second inductor 64B are spirally wound around the core 64C. A winding direction of the first inductor 64A with respect to the core 64C from the first output portion 64A2 to the first input portion 64A1 is the same as a winding direction of the second inductor 64B with respect to the core 64C from the second output portion 64B2 to the second input portion 64B1. To be specific, a portion of the first inductor 64A that is visible in front of the core 64C extends from an upper left to a lower right, and is wound counterclockwise around the core 64C. Similarly, a portion of the second inductor 64B that is visible in front of the core 64C extends from an upper left to a lower right, and is wound counterclockwise around the core 64C. The number of turns of the first inductor 64A around the core 64C is the same as the number of turns of the second inductor 64B around the core 64C.

The transistor 65 is, for example, an N-channel metal-oxide-semiconductor field-effect transistor (MOSFET). To be specific, the transistor 65 may be, for example, a transistor with a model number "STW14NM50" manufactured by STMicroelectronics. As illustrated in FIG. 7, the transistor 65 includes a gate electrode 65A, a source electrode 65B, a drain electrode 65C, and a channel region. The PWM signal supply section 62 and a resistor R2 are connected in series to the gate electrode 65A. A resistance value of the resistor R2 is, for example, about 0.5Ω. The drain electrode 65C is connected in parallel to the resonant circuit 66 with respect to the first output portion 64A2 of the first inductor 64A. The source electrode 65B is grounded. The transistor 65 is in an ON state when a voltage exceeding a threshold voltage is applied to the gate electrode 65A. In the transistor 65 in the ON state, a drain current flows between the source electrode 65B and the drain electrode 65C via the channel region. A high potential and a low potential are alternately and periodically supplied from the PWM signal supply section 62 to the gate electrode 65A. During a period in which the high potential is supplied to the gate electrode 65A (hereinafter referred to as an ON period), the transistor 65 is in the ON state. During a period in which the low potential is supplied to the gate electrode 65A (hereinafter referred to as an OFF period), the transistor 65 is in an OFF state. The control unit 40 controls the PWM signal supply section 62 to appropriately adjust a duty ratio, which is a time ratio between the ON period and the OFF period in the PWM signal.

The resonant circuit 66 includes two inductors L1 and L2, three capacitor C2, C3, and C4, one resistor R3, and one diode D1. The inductor L1 and the capacitor C2 are connected in series. An inductance of the inductor L1 is, for example, about 1.72 μH. An electrostatic capacitance of the capacitor C2 is, for example, about 2.7 nF. The inductor L1, the capacitor C3, and the diode D1 are connected in parallel with respect to the first output portion 64A2 of the first inductor 64A. Of a pair of electrodes constituting the capacitor C3, the electrode on an opposite side of the electrode connected to the first output portion 64A2 is grounded. An electrostatic capacitance of the capacitor C3 is, for example, about 450 pF. An anode of the diode D1 is grounded. The diode D1 is a fast recovery diode suitable for rectifying high frequencies. The diode D1 may be, for example, a diode with a model number "RF305BM6S" manufactured by ROHM Co., Ltd. Of a pair of electrodes constituting the capacitor C2, to the electrode on an opposite side of the electrode connected to the inductor L1, the inductor L2 and the resistor R3 are connected in parallel. An inductance of the inductor L2 is, for example, about 265 nH. The capacitor C4 is connected in series to the inductor L2. An electrostatic capacitance of the capacitor C4 is, for example, about 1.18 nF. Of a pair of electrodes of the capacitor C4, the electrode on an opposite side of the electrode connected to the inductor L2 is grounded. A resistance value of the resistor R3 is, for example, about 50Ω. The resistor R3 is grounded.

A return current flows through the resonant circuit 66 having such a configuration in accordance with a drive state of the transistor 65. To be specific, when the transistor 65 is in the ON state, in the resonant circuit 66, the return current flows from a capacitor C2 side to an inductor L1 side. At this time, the drain current flowing through the transistor 65 is the sum of the current flowing from the DC power supply 61 and the return current. Thus, when the transistor 65 is in the ON state, no current flows through the capacitor C3, and the potential thereof is maintained at 0. The potential of the capacitor C3 matches a drain voltage. On the other hand, when the transistor 65 is in the OFF state, the return current flows from the inductor L1 side to the capacitor C2 side in the resonant circuit 66. That is, the return current flowing through the resonant circuit 66 when the transistor 65 is in the OFF state is opposite to the return current flowing through the resonant circuit 66 when the transistor 65 is in the ON state. When the transistor 65 is in the OFF state, the current from the DC power supply 61 is divided into a current flowing through the capacitor C2 and a current flowing through the capacitor C3. At this time, a current obtained by subtracting the return current from the current flowing from the DC power supply 61 flows through the capacitor C3. In accordance with this, the capacitor C3 is charged, and the potential of the capacitor C3, that is, the drain voltage is increased. By appropriately setting the capacitors C2 and C3, the drain voltage can be set to 0 V at a timing when the transistor 65 is switched from the OFF state to the ON state and at a timing when the transistor 65 is switched from the ON state to the OFF state (a timing of switching from the ON period of the PWM signal to the OFF period and a timing of switching from the OFF period of the PWM signal to the ON period). Thus, the transistor 65 can be driven in a zero voltage switching (ZVS) state.

An induced electromotive force is generated in the second inductor 64B in synchronization with the timing when the transistor 65 is switched from the OFF state to the ON state and at the timing when the transistor 65 is switched from the ON state to the OFF state. When the power supply voltage of the DC power supply 61 is "V1" and the drain voltage of the transistor 65 is "Vd", the induced electromotive force generated in the second inductor 64B is "Vd−V1". In other words, the induced electromotive force is generated in the second inductor 64B in which the power supply voltage of the DC power supply 61 is offset from the drain voltage. The induced electromotive force generated in the second inductor 64B is then applied to the first electrode 21. Voltages with opposite polarities are applied to the first electrode 21 in synchronization with the timing at which the transistor 65 is switched from the OFF state to the ON state and the timing at which the transistor 65 is switched from the ON state to the OFF state. To be specific, during an ON period in which the transistor 65 is in the ON state, a voltage having a positive polarity is applied to the first electrode 21, and during an OFF period in which the transistor 65 is in the OFF state, a voltage having a negative polarity is applied to the first electrode 21. As described above, the dispersion voltage DV with a rectangular waveform (see FIG. 5A) is applied to the first electrode 21. A voltage obtained by superimposing the compensation voltage CV, which is the first compensation potential supplied from the first compensation potential supply section 63, on the dispersion voltage DV described above is applied to the first electrode 21.

As described above, the first electrode 21 is connected to the second input portion 64B1 of the second inductor 64B included in the potential supply circuit 60, but is not directly connected to the first inductor 64A. Thus, even when load fluctuations occur, for example, when variations occur in the space between the first electrode 21 and the second electrode 22, potential fluctuations, due to the load fluctuations, in the first inductor 64A connected to the DC power supply 61 at the first input portion 64A1 are avoided. This stabilizes the induced electromotive force generated in the second inductor 64B, thus stabilizing detection of charged particles.

Figure 9:
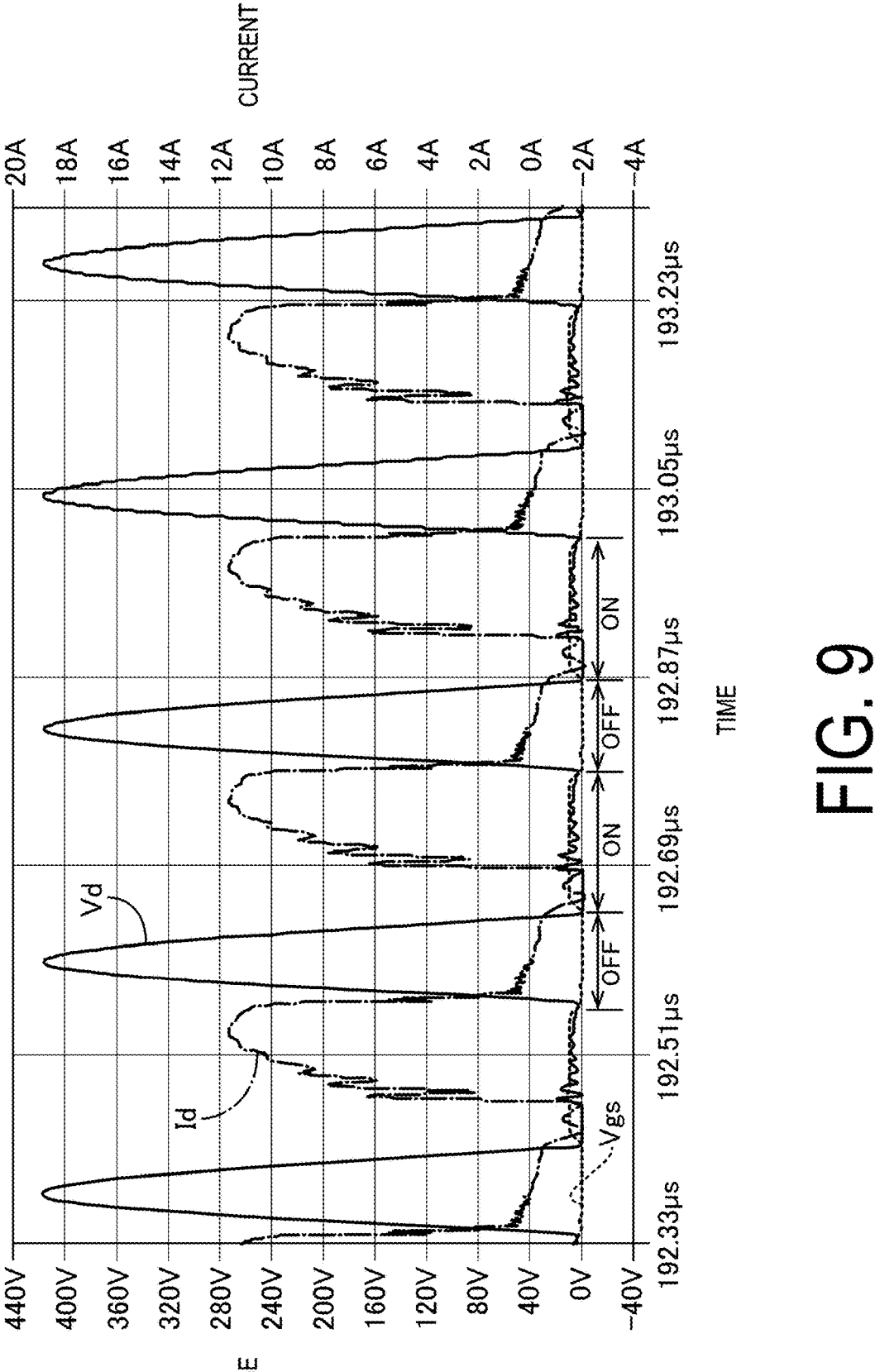
FIG. 9 is a graph showing waveforms of a drain voltage, a drain current, and a gate voltage.

Next, specific various voltage waveforms and the like when operating the potential supply circuit 60 of the detector having the above-described configuration will be described with reference to FIGS. 9 and 10. FIG. 9 is a graph showing waveforms of the drain voltage Vd and a drain current Id, which change according to the drive state of the transistor 65, together with a waveform of a gate voltage $V_{gs}$. A horizontal axis of the graph in FIG. 9 is time (unit is "μs"). A vertical axis of the graph in FIG. 9 represents a voltage (unit is "V") related to the drain voltage Vd and the gate voltage $V_{gs}$, and a current (unit is "A") related to the drain electrode Id.

According to FIG. 9, when a low potential is supplied from the PWM signal supply section 62 to the gate electrode 65A, the gate voltage $V_{gs}$ is substantially 0 V. When a high potential is supplied from the PWM signal supply section 62 to the gate electrode 65A, the gate voltage $V_{gs}$ has a positive voltage value that exceeds the threshold voltage. In FIG. 9, the OFF period during which the low potential is supplied to the gate electrode 65A is denoted by "OFF", and the ON period during which the high potential is supplied to the gate electrode 65A is denoted by "ON". According to FIG. 9, during the ON period, although the drain current Id flows, the drain voltage Vd is substantially 0 V, and during the OFF period, although the drain current Id hardly flows, the drain voltage Vd has a positive value. A waveform of the drain voltage Vd during the OFF period is substantially a semi-sinusoidal wave. A peak value of the drain voltage Vd during the OFF period is higher than the power supply voltage V1 (100 V) of the DC power supply 61, for example, more than 3.5 times the power supply voltage V1. This is because the drain voltage Vd is amplified (boosted) by the transistor 65 and the resonant circuit 66. Thus, when the control unit 40 controls the PWM signal supply section 62 to output a high frequency PWM signal, a high frequency and high voltage drain voltage Vd can be obtained. According to FIG. 9, the drain voltage Vd is substantially 0 V at both a timing of switching from the ON period to the OFF period and a timing of switching from the OFF period to the ON period. Thus, the transistor 65 according to the present embodiment is driven in the ZVS state, which is suitable for low power consumption. The control unit 40 controls the PWM signal supply section 62 to supply the PWM signal in which the ON period is longer than the OFF period to the gate electrode 65A.

Figure 10:
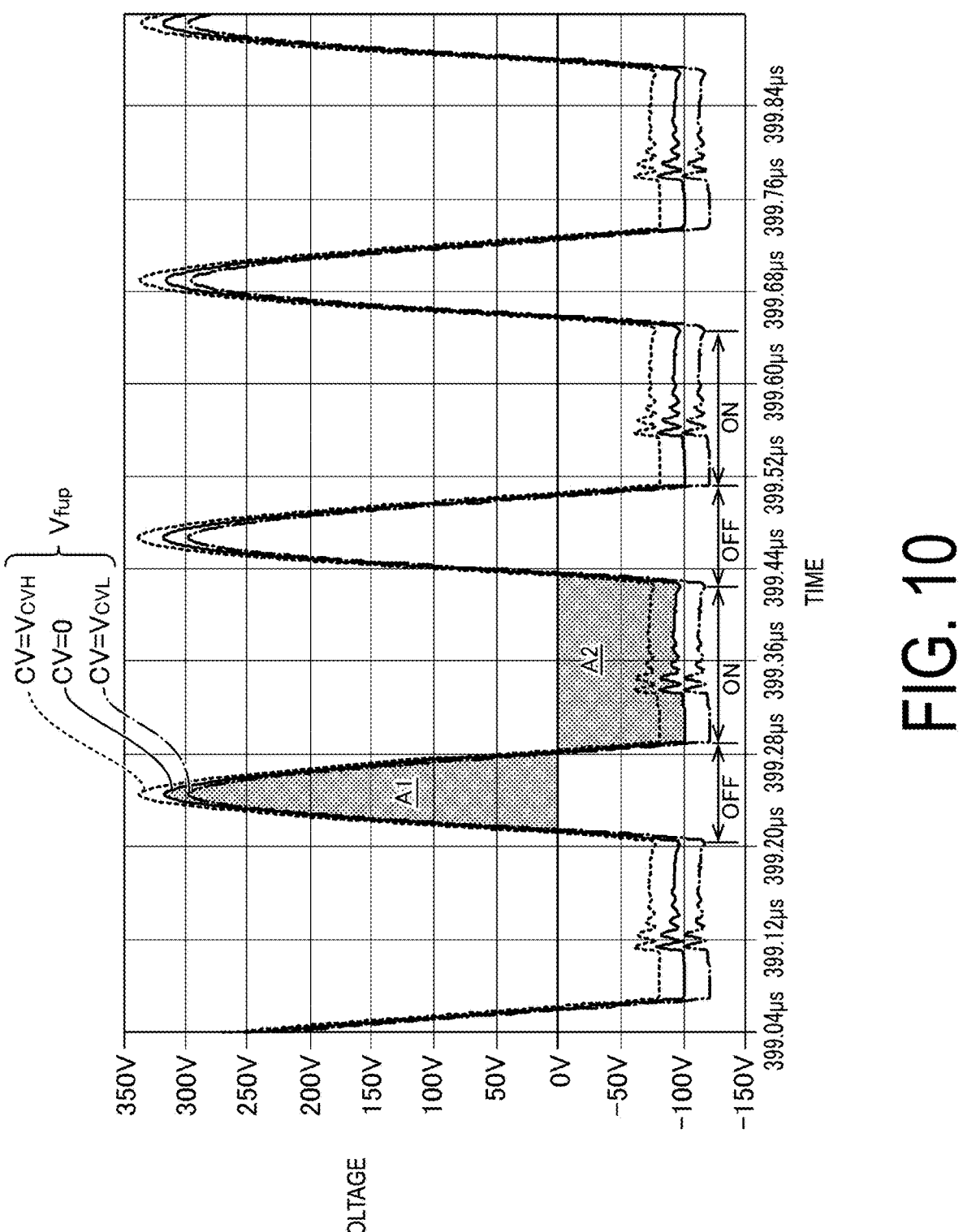
FIG. 10 is a graph showing waveforms of voltages applied to the first electrode.

Next, waveforms of a voltage $V_{fup}$ applied to the first electrode 21 are shown in the graph in FIG. 10. A horizontal axis of the graph in FIG. 10 is time (unit is "μs"). A vertical axis of the graph in FIG. 10 is a voltage (unit is "V") related to the voltage $V_{fup}$. In FIG. 10, in order to show a relationship between the drive state of the transistor 65 and the voltage $V_{fup}$, the OFF period during which the low potential is supplied to the gate electrode 65A is denoted by "OFF", and the ON period during which the high potential is supplied to the gate electrode 65A is denoted by "ON". The voltage $V_{fup}$ applied to the first electrode 21 here is a voltage obtained by superimposing the compensation voltage CV, which is the first compensation potential supplied from the first compensation potential supply section 63, on the dispersion voltage DV, which is the induced electromotive force generated in the second inductor 64B in accordance with the drive state of the transistor 65. FIG. 10 shows three representative examples of the voltage $V_{fup}$: when the compensation voltage CV is the upper limit voltage $V_{CVH}$ (+20 V); when the compensation voltage CV is 0 V; and when the compensation voltage CV is the lower limit voltage $V_{CVL}$ (−20 V). When the compensation voltage CV is 0 V, the dispersion voltage DV is equal to the voltage $V_{fup}$.

According to FIG. 10, the voltage $V_{fup}$ applied to the first electrode 21 is a potential obtained by superimposing the compensation voltage CV on the dispersion voltage DV calculated by offsetting the power supply voltage V1 of the DC power supply 61 from the drain voltage Vd. In detail, during the OFF period of the transistor 65, the dispersion voltage DV is a positive polarity potential obtained by offsetting the power supply voltage V1 (100 V) of the DC power supply 61 from the drain voltage Vd, which is higher than the power supply voltage V1. Thus, a peak value of the dispersion voltage DV during the OFF period is lower than the peak value of the drain voltage Vd (see FIG. 9) by the power supply voltage V1 of the DC power supply 61. The peak value of the dispersion voltage DV during the OFF period coincides with the high voltage level $V_H$ that forms the high electrical field illustrated in FIG. 5A. A waveform of the dispersion voltage DV during the OFF period is substantially a semi-sinusoidal wave. Thus, the OFF period of the transistor 65 coincides with the period $T_H$ of the high voltage level $V_H$ illustrated in FIG. 5A. During the ON period of the transistor 65, the dispersion voltage DV is a negative polarity potential obtained by offsetting the power supply voltage V1 of the DC power supply 61 from the drain voltage Vd, which is substantially 0 V. The dispersion voltage DV during the ON period coincides with the low voltage level $V_L$ that forms the low electrical field illustrated in FIG. 5A. A waveform of the dispersion voltage DV during the ON period is substantially a rectangular wave. Thus, the ON period of the transistor 65 coincides with the period $T_L$ of the low voltage level $V_L$ illustrated in FIG. 5A. An absolute value of the peak value of the dispersion voltage DV during the OFF period is larger than an absolute value of the peak value of the dispersion voltage DV during the ON period. On the other hand, as described above, the ON period is longer than the OFF period. An area of a region A1 surrounded by the waveform of the dispersion voltage DV during the OFF period and a horizontal axis (0 V reference line) in FIG. 10 is equal to an area of a region A2 surrounded by the waveform of the dispersion voltage DV during the ON period and the horizontal axis in FIG. 10. In FIG. 10, the areas A1 and A2 are shown as shaded areas. In order to equalize the areas of the regions A1 and A2, the control unit 40 controls the PWM signal supply section 62 to adjust the duty ratio of the PWM signal and change the compensation voltage CV in a range from the lower limit voltage $V_{CVL}$ to the upper limit voltage $V_{CVH}$. The voltage $V_{fup}$ obtained by superimposing the compensation voltage CV on the dispersion voltage DV is a bipolar pulse voltage that shows both positive and negative polarities similar to the dispersion voltage DV, and the potentials in both positive and negative polarities are switched asymmetrically. As described above, the high frequency and high voltage voltage $V_{fup}$ can be applied to the first electrode 21 with low power consumption.

As described above, the detector 50 of the present embodiment includes the first electrode 21, the second electrode 22 facing the first electrode 21 with a space and forming the flow path 25 for charged particles as the objects to be detected between the first electrode 21 and the second electrode 22, the detection electrode (third electrode) 26 arranged side by side with the second electrode 22 on the downstream side in the flow path 25 with respect to the second electrode 22 and configured to collect the charged particles, and the potential supply circuit 60 configured to supply a potential to at least one of the first electrode 21 and the second electrode 22. The potential supply circuit 60 includes the first inductor 64A including the first input portion 64A1 and the first output portion 64A2, and the second inductor 64B including the second input portion 64B1 and the second output portion 64B2. The first input portion 64A1 of the first inductor 64A is connected to the DC power supply 61, and the second input portion 64B1 of the second inductor 64B is connected to the first electrode 21 or the second electrode 22.

When a potential is supplied to at least one of the first electrode 21 and the second electrode 22 by the potential supply circuit 60, an electrical field is generated between the first electrode 21 and the second electrode 22. This electrical field controls whether or not charged particles pass through the flow path 25 formed between the first electrode 21 and the second electrode 22. The charged particles passing through the flow path 25 are collected and detected by the detection electrode 26. The first electrode 21 or the second electrode 22 is connected to the second input portion 64B1 of the second inductor 64B included in the potential supply circuit 60, but is not directly connected to the first inductor 64A. Thus, even when load fluctuations occur, for example, when variations occur in the space between the first electrode 21 and the second electrode 22, potential fluctuations, due to the load fluctuations, in the first inductor 64A connected to the DC power supply 61 at the first input portion 64A1 are avoided. This stabilizes the induced electromotive force generated in the second inductor 64B, thus stabilizing detection of charged particles.

The potential supply circuit 60 includes the transistor 65 and the resonant circuit 66. The transistor 65 includes the gate electrode 65A, the source electrode 65B, and the drain electrode 65C. The gate electrode 65A is connected to the PWM signal supply section 62 that generates the PWM signal, and the drain electrode 65C and the resonant circuit 66 are connected in parallel with respect to the first output portion 64A2. When the PWM signal generated from the PWM signal supply section 62 is supplied to the gate electrode 65A, during the ON period of the PWM signal, the drain current flows between the source electrode 65B and the drain electrode 65C and the return current flows through the resonant circuit 66, and during the OFF period of the PWM signal, the return current flows through the resonant circuit 66 in the direction opposite to that during the ON period. At the timing of switching from the ON period to the OFF period and at the timing of switching from the OFF period to the ON period, the potential of the drain electrode 65C is substantially 0 V. That is, the transistor 65 is driven in the zero voltage switching (ZVS) state. Thus, power consumption can be reduced. The induced electromotive force synchronized with the PWM signal is generated in the second inductor 64B. To be specific, the potential is generated periodically such that the polarity (positive or negative) of the potential generated in the second inductor 64B is reversed between the ON period and the OFF period of the PWM signal. Thus, since the positive and negative potentials are periodically applied to at least one of the first electrode 21 and the second electrode 22, whether or not the charged particles pass through the flow path 25 between the first electrode 21 and the second electrode 22 is controlled favorably.

The second input portion 64B1 of the second inductor 64B is connected to the first electrode 21. When the induced electromotive force synchronized with the PWM signal is generated in the second inductor 64B, positive and negative potentials are periodically applied to the first electrode 21 connected to the second input portion 64B1 of the second inductor 64B. To be specific, during the ON period of the PWM signal, a potential having a negative polarity or a positive polarity is applied to the first electrode 21, and during the OFF period of the PWM signal, a potential having a positive polarity or a negative polarity is applied to the first electrode 21. Thus, between the first electrode 21 and the second electrode 22, a potential difference synchronized with the PWM signal is periodically generated. Since the first electrode 21 and the second electrode 22 are electrically separated from the transistor 65 and the resonant circuit 66 that are the constituent elements of the potential supply circuit 60, even when load fluctuations occur due to the first electrode 21 and the second electrode 22, potential fluctuations due to the load fluctuations can be avoided in the transistor 65 and the resonant circuit 66.

The second input portion 64B1 and the first electrode 21 are connected in parallel with respect to the first compensation potential supply section 63 that generates the first compensation potential. The potential obtained by superimposing the first compensation potential generated from the first compensation potential supply section 63 on the potential based on the induced electromotive force generated in the second inductor 64B is applied to the first electrode 21. Whether or not charged particles pass through the flow path 25 is controlled according to the first compensation potential.

Second Embodiment

A second embodiment will be described with reference to FIG. 11 to FIG. 15. In the second embodiment, a case is illustrated in which a potential is supplied to a second electrode 122 and a configuration of a dual inductor 164 is changed. Further, repetitive descriptions of structures, actions, and effects similar to those of the first embodiment described above will be omitted.

Figure 11:
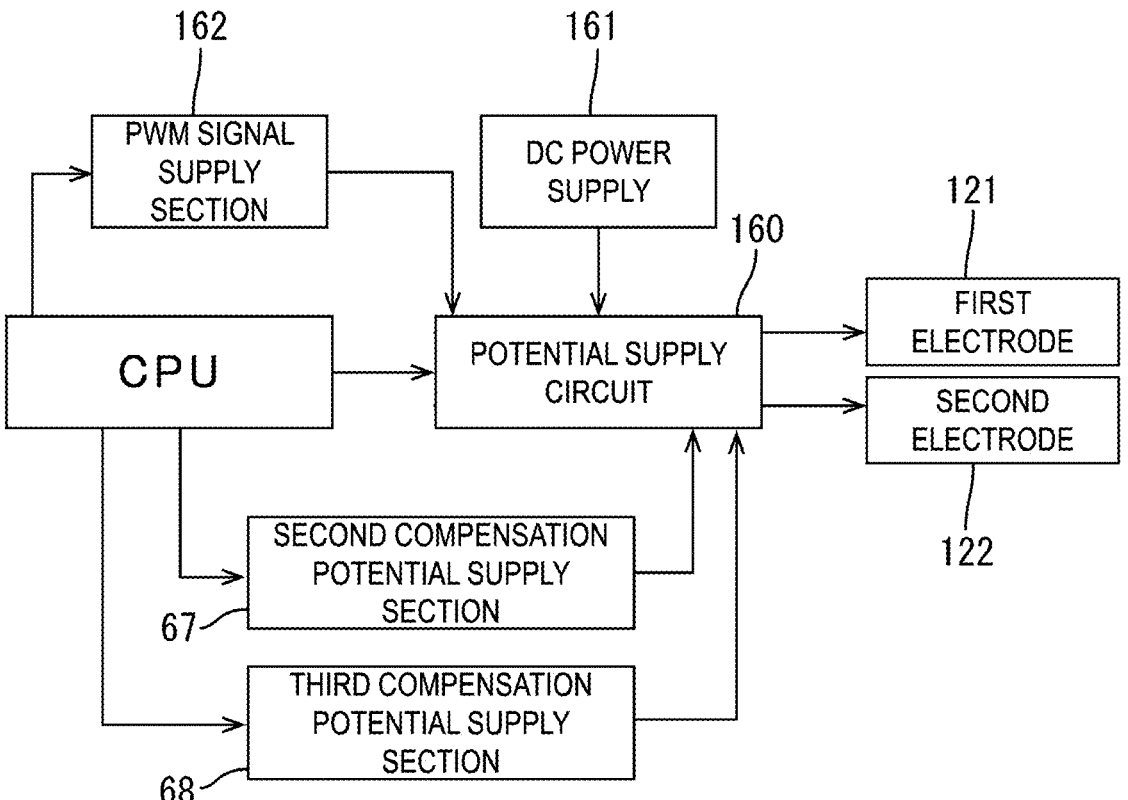
FIG. 11 is a block diagram illustrating an electrical configuration related to a potential supply circuit of a detector according to a second embodiment.

As illustrated in FIG. 11, a potential supply circuit 160 according to the present embodiment supplies a potential to the second electrode 122 in addition to a first electrode 121. Instead of the first compensation potential supply section 63 (see FIG. 6) described in the first embodiment, a second compensation potential supply section 67 and a third compensation potential supply section 68 are connected to the potential supply circuit 160. The second compensation potential supply section 67 is controlled by a CPU to supply a second compensation potential to the potential supply circuit 160. The second compensation potential is supplied to the first electrode 121. The third compensation potential supply section 68 is controlled by the CPU to supply a third compensation potential to the potential supply circuit 160. The third compensation potential is supplied to the second electrode 122. The CPU controls the second compensation potential supply section 67 and the third compensation potential supply section 68 to make a potential difference between the second compensation potential and the third compensation potential the same as a compensation voltage CV (refer to FIG. 5B).

Figure 12:
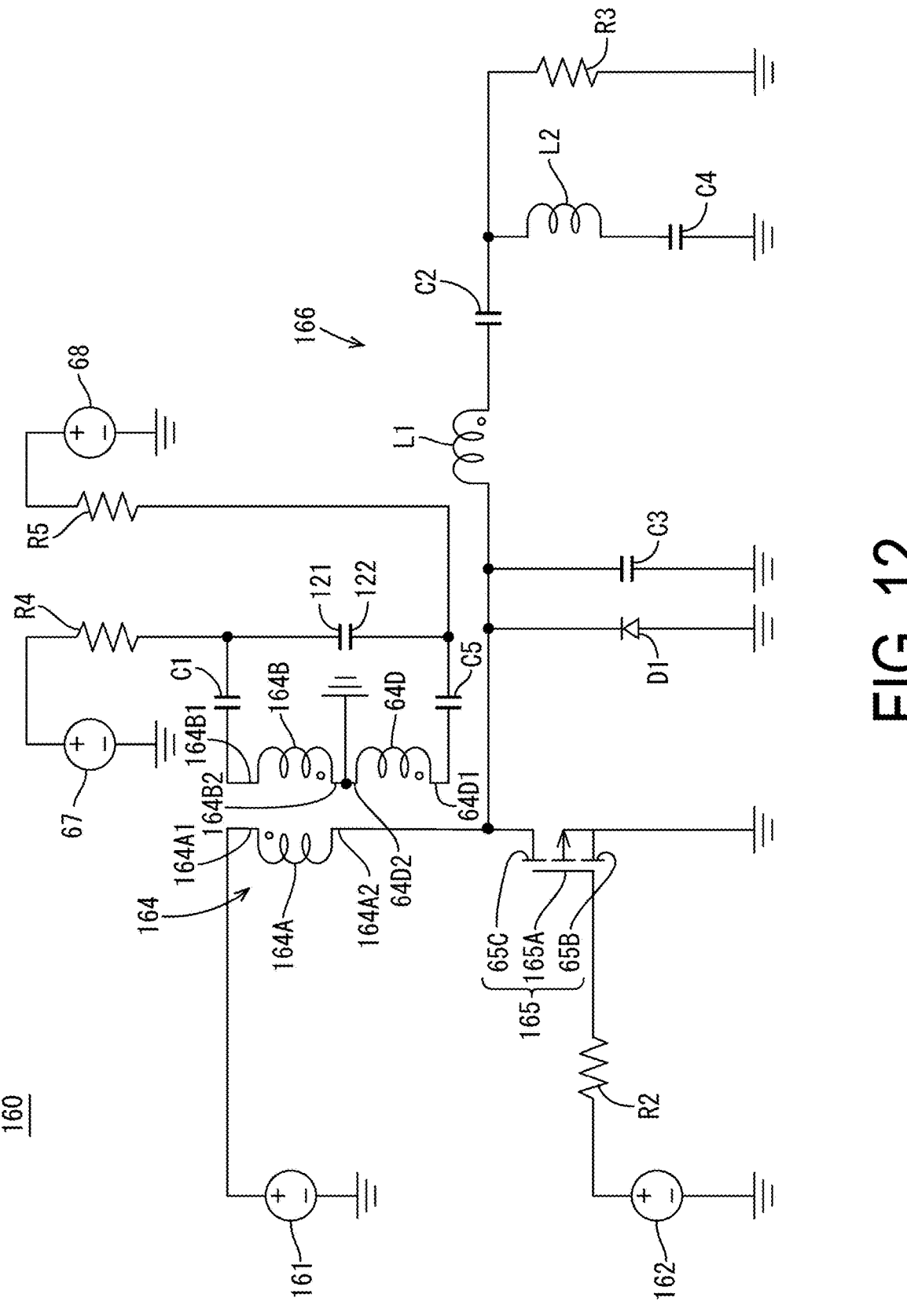
FIG. 12 is a circuit diagram of the potential supply circuit.

As illustrated in FIG. 12, the dual inductor 164 of the potential supply circuit 160 includes a third inductor 64D in addition to a first inductor 164A and a second inductor 164B. In the present embodiment, a second input portion 164B1 of the second inductor 164B is connected in parallel to the second compensation potential supply section 67 and the first electrode 121. Thus, the second compensation potential is supplied from the second compensation potential supply section 67 to the first electrode 121. The third inductor 64D is formed of a winding, and one end portion thereof is a third input portion 64D1, and the other end portion thereof is a third output portion 64D2. The third input portion 64D1 is connected in parallel to the third compensation potential supply section 68 and the second electrode 122. Thus, the third compensation potential is supplied from the third compensation potential supply section 68 to the second electrode 122. The third output portion 64D2 is grounded. A capacitor C5 is connected in series to the third input portion 64D1. An electrostatic capacitance of the capacitor C5 is the same as an electrostatic capacitance of a capacitor C1 and is, for example, about 10 nF. A resistor R4 is connected in series to the second compensation potential supply section 67. A resistance value of the resistor R4 is, for example, about 10 kΩ. A resistor R5 is connected in series to the third compensation potential supply section 68. A resistance value of the resistor R5 is, for example, about 10 kΩ.

Figure 13:
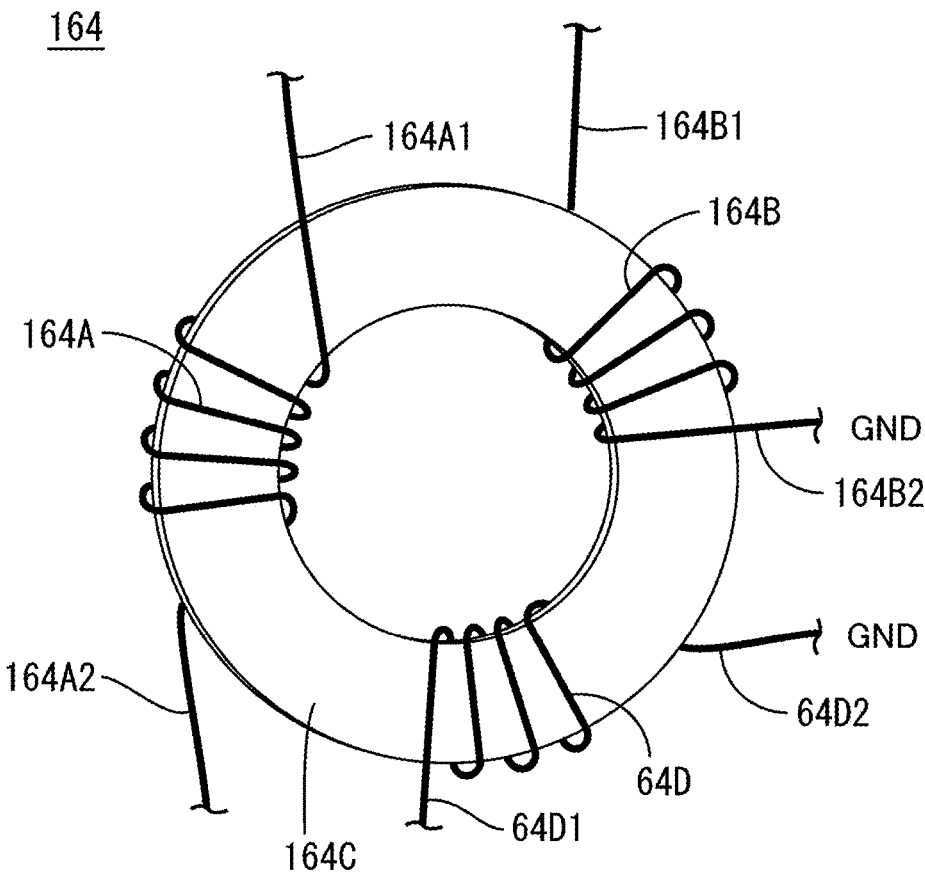
FIG. 13 is a plan view illustrating a schematic configuration of a dual inductor.

As illustrated in FIG. 13, in addition to the first inductor 164A and the second inductor 164B, the third inductor 64D is wound around a core 164C of the dual inductor 164. Similar to the first inductor 164A and the second inductor 164B, the third inductor 64D is spirally wound around the core 164C. A winding direction of the third inductor 64D with respect to the core 164C from the third output portion 64D2 to the third input portion 64D1 is the same as both a winding direction of the first inductor 164A with respect to the core 164C from a first output portion 164A2 to a first input portion 164A1 and a winding direction of the second inductor 164B with respect to the core 164C from a second output portion 164B2 to a second input portion 164B1. To be specific, a portion of the third inductor 64D that is visible in front of the core 164C extends from an upper left to a lower right, and is wound counterclockwise around the core 164C. That is, the first inductor 164A, the second inductor 164B, and the third inductor 64D are all wound counterclockwise around the core 164C. The number of turns of the third inductor 64D around the core 164C is the same as the number of turns of the first inductor 164A around the core 164C, and is also the same as the number of turns of the second inductor 164B around the core 164C.

In the potential supply circuit 160 having such a configuration, when a transistor 165 is switched from an OFF state to an ON state and from the ON state to the OFF state based on a PWM signal supplied from a PWM signal supply section 162, induced electromotive forces are generated in the second inductor 164B and the third inductor 64D in synchronization with the switching. When the induced electromotive force synchronized with the PWM signal is generated in the second inductor 164B, positive and negative potentials are periodically applied to the first electrode 121 connected to the second input portion 164B1 of the second inductor 164B. To be specific, during an ON period of the PWM signal, a potential having a negative polarity is applied to the first electrode 121, and during an OFF period of the PWM signal, a potential having a positive polarity is applied to the first electrode 121. When the induced electromotive force synchronized with the PWM signal is generated in the third inductor 64D, positive and negative potentials are periodically applied to the second electrode 122 connected to the third input portion 64D1 of the third inductor 64D. To be specific, during the ON period of the PWM signal, a potential having a positive polarity is applied to the second electrode 122, and during the OFF period of the PWM signal, a potential having a negative polarity is applied to the second electrode 122. Thus, potentials applied to the first electrode 121 and the second electrode 122 always have opposite polarities during both the ON period and the OFF period. Therefore, a potential difference generated between the first electrode 121 and the second electrode 122 is about twice as large as that in the first embodiment. Thus, field intensity of an electrical field generated between the first electrode 121 and the second electrode 122 can be increased. The potential difference generated between the first electrode 121 and the second electrode 122 is a dispersion voltage DV. Moreover, a potential obtained by superimposing the second compensation potential generated from the second compensation potential supply section 67 on the potential based on the induced electromotive force of the second inductor 164B is applied to the first electrode 121. Similarly, a potential obtained by superimposing the third compensation potential generated from the third compensation potential supply section 68 on the potential based on the induced electromotive force of the third inductors 64D is applied to the second electrode 122.

Figure 14:
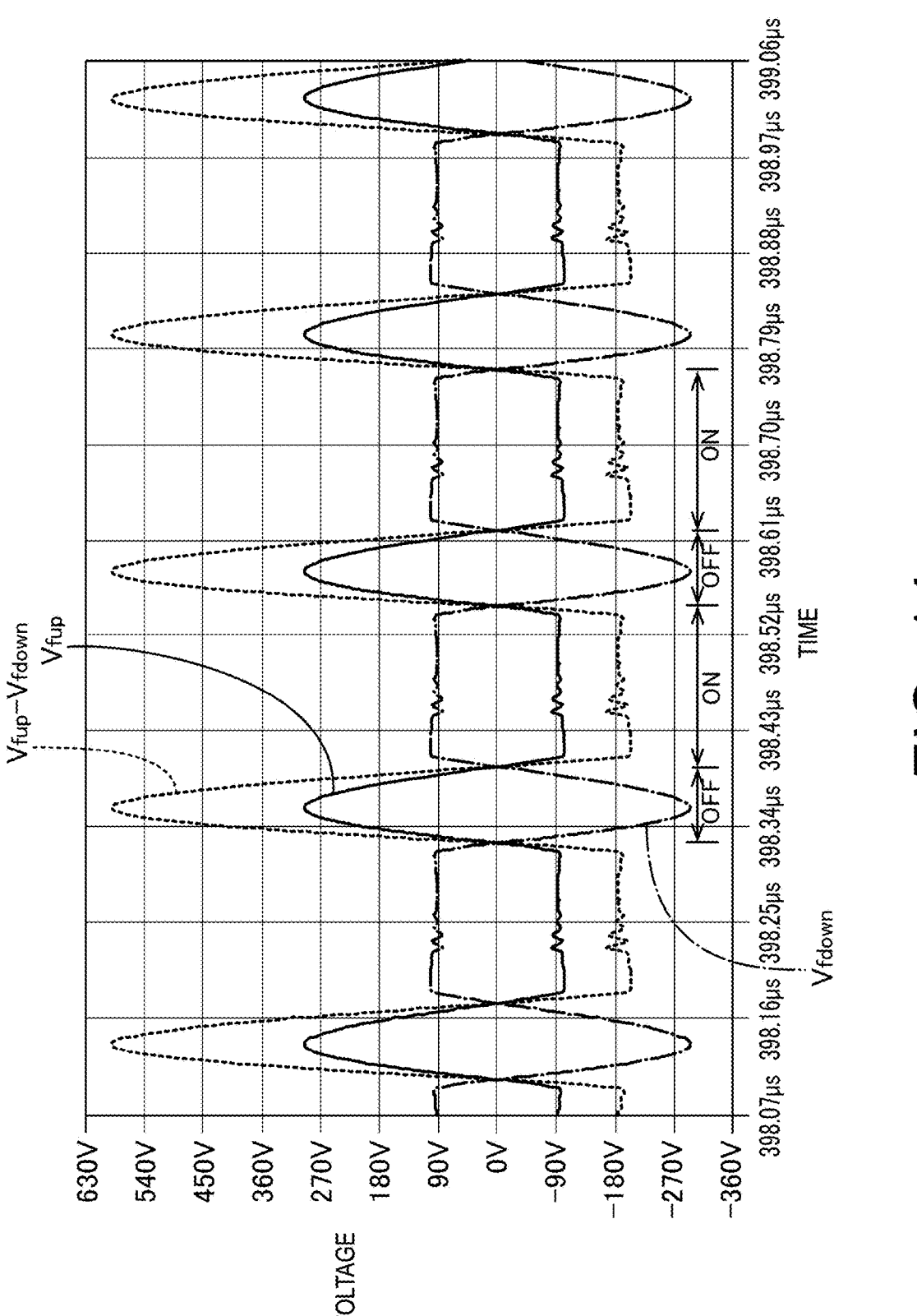
FIG. 14 is a graph showing waveforms of voltages applied to a first electrode and a second electrode.

Next, specific various voltage waveforms and the like when operating the potential supply circuit 160 having the above-described configuration will be described with reference to FIGS. 14 and 15. A graph in FIG. 14 shows a waveform of a voltage $V_{fup}$ applied to the first electrode 121 and a waveform of a voltage $V_{fdown}$ applied to the second electrode 122 when the compensation voltage CV is 0 V. FIG. 14 also shows a potential difference ($V_{fup}-V_{fdown}$) between the first electrode 121 and the second electrode 122 when the compensation voltage CV is 0 V, that is, a waveform of the dispersion voltage DV. A horizontal axis of the graph in FIG. 14 is time (unit is "μs"). A vertical axis of the graph in FIG. 14 is a voltage (unit is "V") related to the voltages $V_{fup}$ and $V_{fdown}$ In FIG. 14, in order to show a relationship between a drive state of the transistor 165 and the voltages $V_{fup}$ and $V_{fdown}$ an OFF period during which a low potential is supplied to a gate electrode 165A is denoted by "OFF", and an ON period during which a high potential is supplied to the gate electrode 165A is denoted by "ON".

According to FIG. 14, during the OFF period of the transistor 165, a potential having a positive polarity is applied to the first electrode 121, and a potential having a negative polarity is applied to the second electrode 122. Waveforms of the voltages $V_{fup}$ and $V_{fdown}$ applied to the first electrode 121 and the second electrode 122 during the OFF period are both substantially semi-sinusoidal waves. During the OFF period, an absolute value of a peak value of the voltage $V_{fup}$ is equal to an absolute value of a peak value of the voltage $V_{fdown}$ During the ON period of the transistor 165, a potential having a negative polarity is applied to the first electrode 121, and a potential having a positive polarity is applied to the second electrode 122. Waveforms of the voltages $V_{fup}$ and $V_{fdown}$ applied to the first electrode 121 and the second electrode 122 during the ON period are both substantially rectangular waves. The waveform of the voltage $V_{fup}$ applied to the first electrode 121 and the waveform of the voltage $V_{fdown}$ applied to the second electrode 122 are substantially symmetrical about a horizontal axis (0 V), and their polarities are always opposite to each other. When the compensation voltage CV is 0 V, the voltage $V_{fup}$ applied to the first electrode 121 is a potential obtained by offsetting a power supply voltage V1 (100 V) of a DC power supply 161 from the drain voltage Vd of the transistor 165. When the compensation voltage CV is 0 V, the voltage $V_{fdown}$ applied to the second electrode 122 is a potential obtained by reversing a polarity of the potential obtained by offsetting the power supply voltage V1 of the DC power supply 161 from the drain voltage Vd of the transistor 165. The potential difference ($V_{fup}-V_{fdown}$) between the first electrode 121 and the second electrode 122 when the compensation voltage CV is 0 V is about twice the value obtained by offsetting the power supply voltage V1 of the DC power supply 161 from the drain voltage Vd of the transistor 165.

Figure 15:
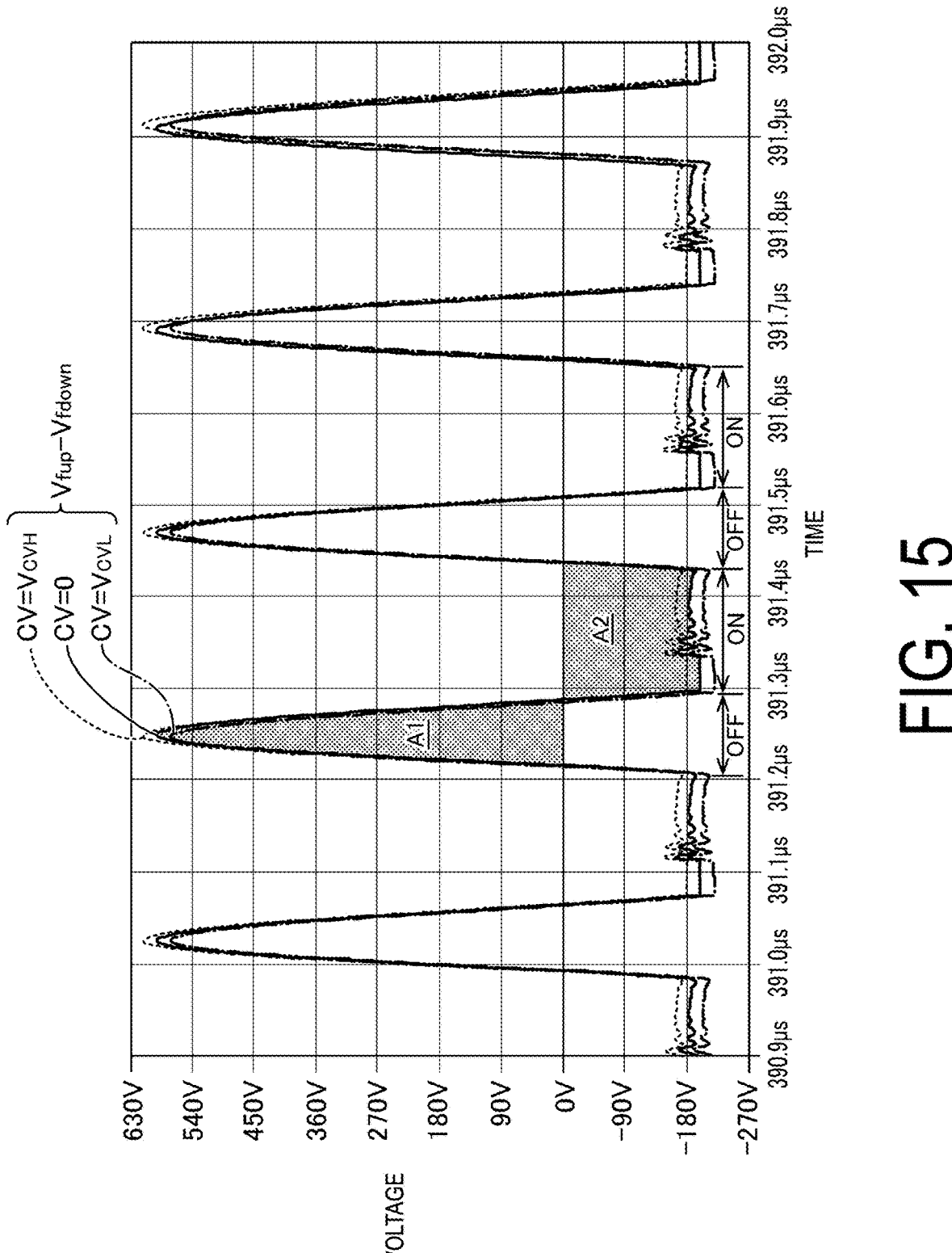
FIG. 15 is a graph showing waveforms of potential differences between the first electrode and the second electrode.

Next, waveforms of the potential difference between the first electrode 121 and the second electrode 122 ($V_{fup}-V_{fdown}$) are shown in a graph in FIG. 15. A horizontal axis of the graph in FIG. 15 is time (unit is "μs"). A vertical axis of the graph in FIG. 15 is a voltage (unit is "V") related to the potential difference ($V_{fup}-V_{fdown}$). In FIG. 15, in order to show a relationship between a drive state of the transistor 165 and the potential difference ($V_{fup}$–$V_{fdown}$), the OFF period during which the low potential is supplied to the gate electrode 165A is denoted by "OFF", and the ON period during which the high potential is supplied to the gate electrode 165A is denoted by "ON". FIG. 15 shows three representative examples of the potential difference ($V_{fup}$–$V_{fdown}$) between the first electrode 121 and the second electrode 122: when the compensation voltage CV is an upper limit voltage $V_{CVH}$ (+20 V); when the compensation voltage CV is 0 V; and when the compensation voltage CV is a lower limit voltage $V_{CVL}$ (–20 V). When the compensation voltage CV is 0 V, the dispersion voltage DV is equal to the potential difference ($V_{fup}$–$V_{fdown}$).

First, the voltage $V_{fup}$ is applied to the first electrode 121. The voltage $V_{fup}$ is obtained by superimposing the second compensation potential supplied from the second compensation potential supply section 67 on the potential obtained by offsetting the power supply voltage V1 of the DC power supply 161 from the drain voltage Vd of the transistor 165. The voltage $V_{fdown}$ is applied to the second electrode 122. The voltage $V_{fdown}$ is obtained by superimposing the third compensation potential supplied from the third compensation potential supply section 68 on the potential obtained by reversing the polarity of the potential obtained by offsetting the power supply voltage V1 of the DC power supply 161 from the drain voltage Vd of the transistor 165. Thus, as shown in FIG. 15, the potential difference ($V_{fup}$–$V_{fdown}$) between the first electrode 121 and the second electrode 122 can be increased to about twice the potential difference ($V_{fup}$–$V_{fdown}$) between the first electrode 21 and the second electrode 22 of the first embodiment described above. Thus, the field intensity of the electrical field generated between the first electrode 121 and the second electrode 122 can also be about twice that of the first embodiment described above. The potential difference ($V_{fup}$–$V_{fdown}$) obtained by superimposing the compensation voltage CV on the dispersion voltage DV is a bipolar pulse voltage that shows both positive and negative polarities, similar to the dispersion voltage DV, and the potentials in both positive and negative polarities are switched asymmetrically. As described above, the high frequency and high voltage potential difference ($V_{fup}$–$V_{fdown}$) can be applied between the first electrode 121 and the second electrode 122 with low power consumption.

As described above, according to the present embodiment, the detector 50 includes the third inductor 64D including the third input portion 64D1 and the third output portion 64D2, and the core 164C having an annular shape around which the first inductor 164A, the second inductor 164B, and the third inductor 64D are wound together. The winding direction of the second inductor 164B with respect to the core 164C from the second input portion 164B1 to the second output portion 164B2 is the same as the winding direction of the third inductor 64D with respect to the core 164C from the third output portion 64D2 to the third input portion 64D1. The second input portion 164B1 of the second inductor 164B is connected to the first electrode 121, and the third input portion 64D1 of the third inductor 64D is connected to the second electrode 122. When the induced electromotive force synchronized with the PWM signal is generated in the second inductor 164B, positive and negative potentials are periodically applied to the first electrode 121 connected to the second input portion 164B1 of the second inductor 164B. To be specific, during the ON period of the PWM signal, a potential having a negative polarity or a positive polarity is applied to the first electrode 121, and during the OFF period of the PWM signal, a potential having a positive polarity or a negative polarity is applied to the first electrode 121. When the induced electromotive force synchronized with the PWM signal is generated in the third inductor 64D, positive and negative potentials are periodically applied to the second electrode 122 connected to the third input portion 64D1 of the third inductor 64D. To be specific, during the ON period of the PWM signal, a potential having a positive polarity or a negative polarity is applied to the second electrode 122, and during the OFF period of the PWM signal, a potential having a positive polarity or a negative polarity is applied to the second electrode 122. Thus, since the potentials of opposite polarities are applied to the first electrode 121 and the second electrode 122, the potential difference between the first electrode 121 and the second electrode 122 is large. Thus, the field intensity of the electrical field generated between the first electrode 121 and the second electrode 122 can be increased. Since the first electrode 121 and the second electrode 122 are electrically separated from the transistor 165 and the resonant circuit 166 that are the constituent elements of the potential supply circuit 160, even when load fluctuations occur due to the first electrode 121 and the second electrode 122, potential fluctuations can be avoided in the transistor 165 and the resonant circuit 166 due to the load fluctuations.

The second input portion 164B1 and the first electrode 121 are connected in parallel with respect to the second compensation potential supply section 67 that generates the second compensation potential, and the third input portion 64D1 and the second electrode 122 are connected in parallel with respect to the third compensation potential supply section 68 that generates the third compensation potential. The potential obtained by superimposing the second compensation potential generated from the second compensation potential supply section 67 on the potential based on the induced electromotive force generated in the second inductor 164B is applied to the first electrode 121. The potential obtained by superimposing the third compensation potential generated from the third compensation potential supply section 68 on the potential based on the induced electromotive force generated in the third inductor 64D is applied to the second electrode 122. Whether or not charged particles pass through the flow path is controlled according to the second compensation potential and the third compensation potential.

Third Embodiment

A third embodiment will be described with reference to FIGS. 16 to 20. The third embodiment is different from the first embodiment described above in that a potential is supplied to a second electrode 222. Further, repetitive descriptions of structures, actions, and effects similar to those of the first embodiment described above will be omitted.

Figure 16:
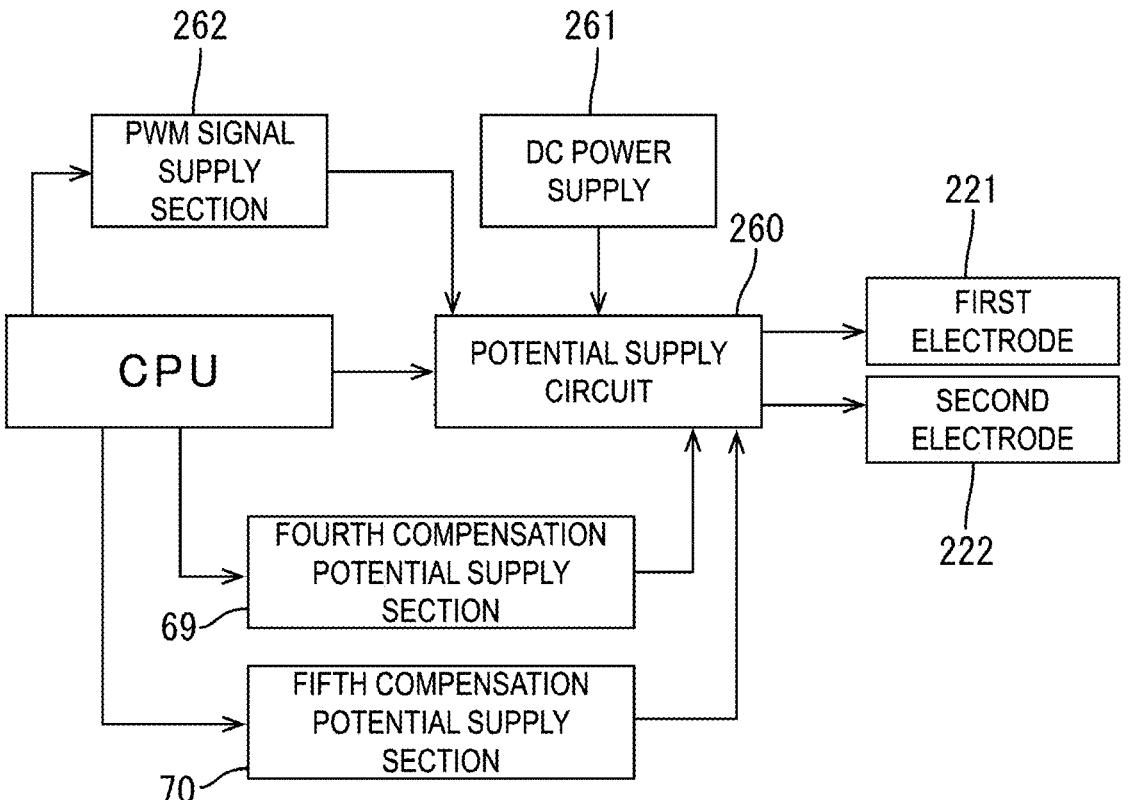
FIG. 16 is a block diagram illustrating an electrical configuration related to a potential supply circuit of a detector according to a third embodiment.

As illustrated in FIG. 16, a potential supply circuit 260 according to the present embodiment supplies a potential to the second electrode 222 in addition to a first electrode 221. Instead of the first compensation potential supply section 63 (see FIG. 6) described in the first embodiment, a fourth compensation potential supply section 69 and a fifth compensation potential supply section 70 are connected to the potential supply circuit 260. The fourth compensation potential supply section 69 is controlled by a CPU to supply a fourth compensation potential to the potential supply circuit 260. The fourth compensation potential is supplied to the first electrode 221. The fifth compensation potential supply section 70 is controlled by the CPU to supply a fifth compensation potential to the potential supply circuit 260. The fifth compensation potential is supplied to the second electrode 222. The CPU controls the fourth compensation potential supply section 69 and the fifth compensation potential supply section 70 to make a potential difference between the fourth compensation potential and the fifth compensation potential the same as a compensation voltage CV (refer to FIG. 5B).

Figure 17:
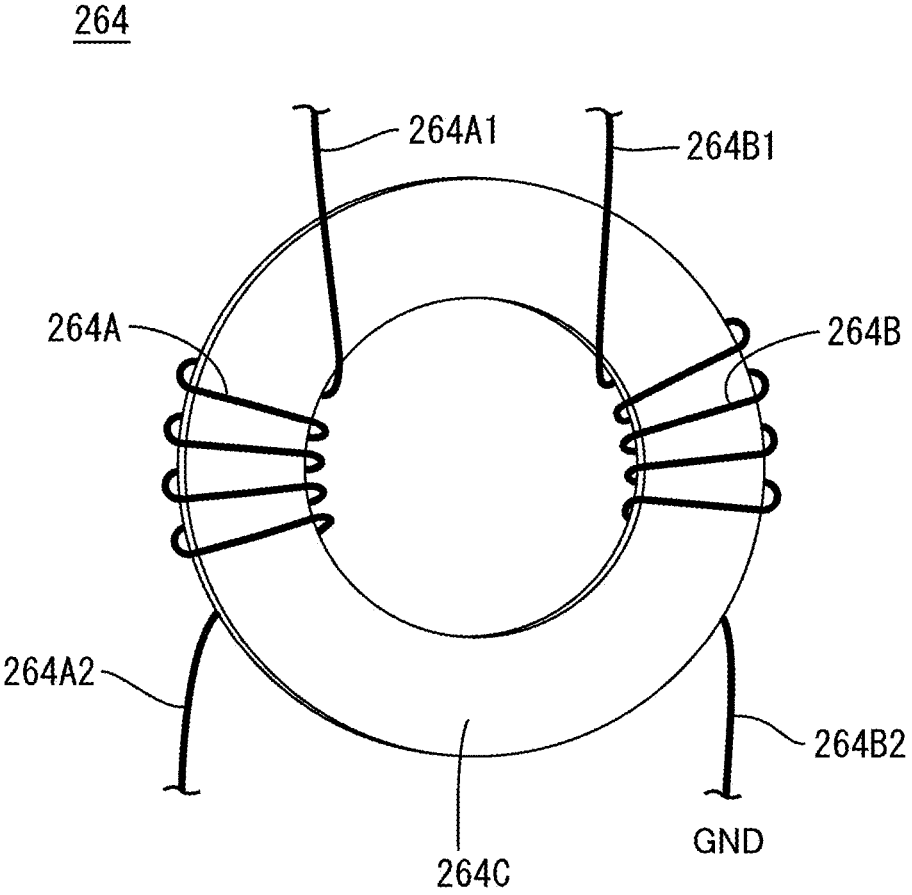
FIG. 17 is a plan view illustrating a schematic configuration of a dual inductor.

As illustrated in FIG. 17, a second inductor 264B is wound around a core 264C of a dual inductor 264 in a direction opposite to a direction in which a first inductor 264A is wound. In detail, the winding direction of the second inductor 264B with respect to the core 264C from a second output portion 264B2 to a second input portion 264B1 is opposite to the winding direction of the first inductor 264A with respect to the core 264C from a first output portion 264A2 to a first input portion 264A1. To be specific, as in the first embodiment, a portion of the first inductor 264A that is visible in front of the core 264C extends from an upper left to a lower right, and is wound counterclockwise around the core 264C. On the other hand, a portion of the second inductor 264B that is visible in front of the core 264C extends from an upper right to a lower left, and is wound clockwise around the core 264C.

Figure 18:
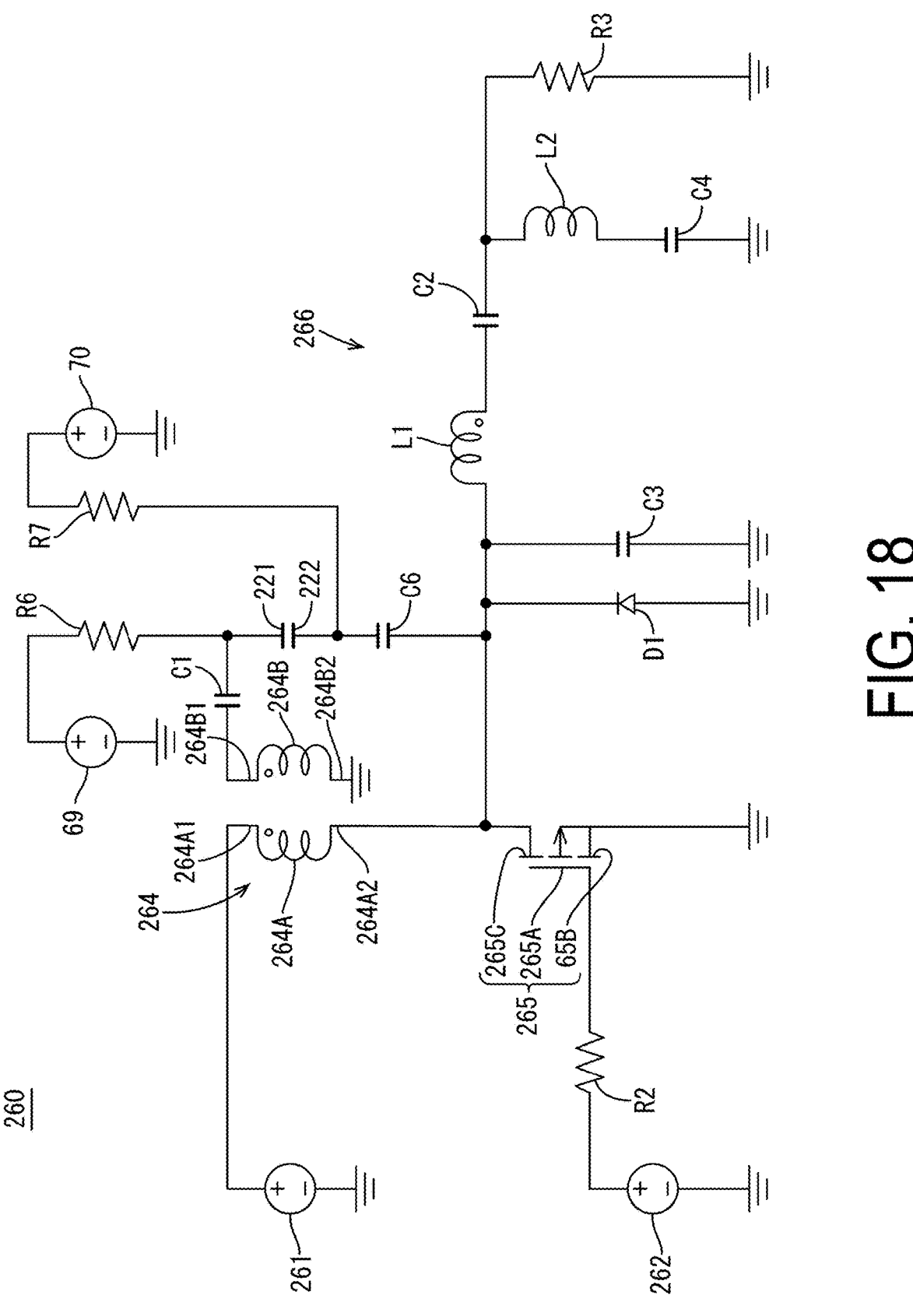
FIG. 18 is a circuit diagram of the potential supply circuit.

As illustrated in FIG. 18, the second input portion 264B1 of the second inductor 264B of the potential supply circuit 260 is connected to the first electrode 221. The fourth compensation potential supply section 69 is connected to the first electrode 221 in parallel with a capacitor C1. Thus, the fourth compensation potential is supplied from the fourth compensation potential supply section 69 to the first electrode 221. On the other hand, the second electrode 222 is connected in parallel to a drain electrode 265C and a resonant circuit 266 with respect to the first output portion 264A2. In detail, the second electrode 222 is coupled to the first output portion 264A2, the drain electrode 265C, and the resonant circuit 266 via a capacitor C6. That is, the capacitor C6 functions as a coupling capacitor. An electrostatic capacitance of the capacitor C6 is the same as an electrostatic capacitance of the capacitor C1 and is, for example, about 10 nF. The fifth compensation potential supply section 70 is connected to the second electrode 222 in parallel with the capacitor C6. Thus, the fifth compensation potential is supplied from the fifth compensation potential supply section 70 to the second electrode 222. A resistor R6 is connected in series to the fourth compensation potential supply section 69. A resistance value of the resistor R6 is, for example, about 10 kΩ. A resistor R7 is connected in series to the fifth compensation potential supply section 70. A resistance value of the resistor R7 is, for example, about 10 kΩ.

In the potential supply circuit 260 having such a configuration, when a transistor 265 is switched from an OFF state to an ON state and from the ON state to the OFF state based on a PWM signal supplied from a PWM signal supply section 262, an induced electromotive force is generated in the second inductor 264B in synchronization with the switching. When the induced electromotive force synchronized with the PWM signal is generated in the second inductor 264B, positive and negative potentials are periodically applied to the first electrode 221 connected to the second input portion 264B1 of the second inductor 264B. To be specific, during an ON period of the PWM signal, a potential having a positive polarity is applied to the first electrode 221, and during an OFF period of the PWM signal, a potential having a negative polarity is applied to the first electrode 221. That is, positive and negative potentials are periodically applied to the first electrode 221 of the present embodiment in a phase opposite to that of the first and second embodiments. On the other hand, negative and positive potentials are applied to the second electrode 222 via the capacitor C6 in the same period as the drain voltage Vd in synchronization with switching from an OFF state to an ON state and from the ON state to the OFF state in the transistor 265. To be specific, during the ON period of the PWM signal, a potential having a negative polarity is applied to the second electrode 222, and during the OFF period of the PWM signal, a potential having a positive polarity is applied to the second electrode 222. Thus, potentials applied to the first electrode 221 and the second electrode 222 always have opposite polarities during both the ON period and the OFF period. Therefore, a potential difference generated between the first electrode 221 and the second electrode 222 is about twice as large as that in the first embodiment. Thus, field intensity of an electrical field generated between the first electrode 221 and the second electrode 222 can be increased. The potential difference generated between the first electrode 221 and the second electrode 222 is a dispersion voltage DV. Moreover, a potential obtained by superimposing the fourth compensation potential generated from the fourth compensation potential supply section 69 on the potential based on the induced electromotive force of the second inductor 264B is applied to the first electrode 221. Similarly, a potential obtained by superimposing the fifth compensation potential generated from the fifth compensation potential supply section 70 on the potential based on the drain voltage Vd is applied to the second electrode 222.

Figure 19:
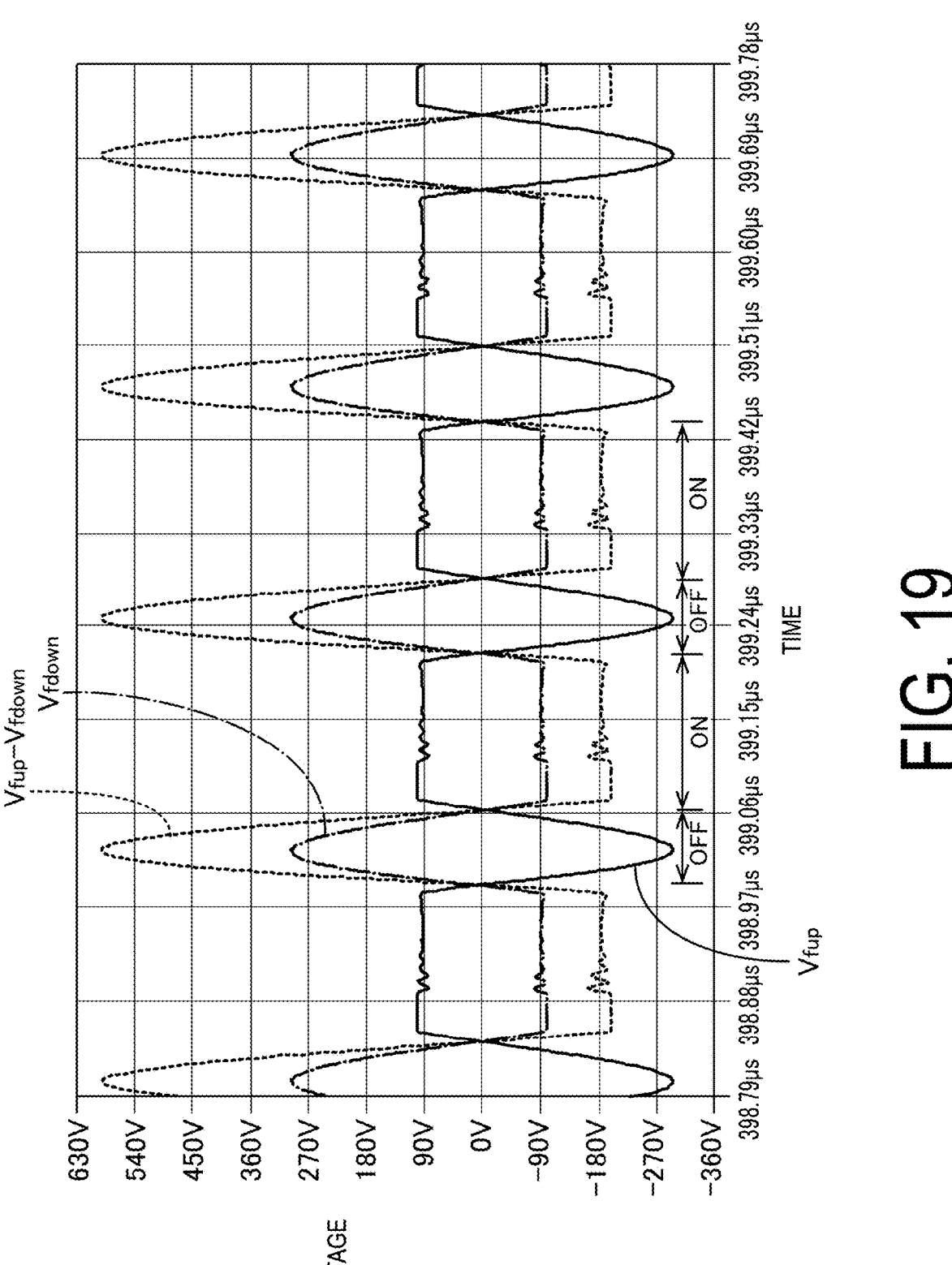
FIG. 19 is a graph showing waveforms of voltages applied to a first electrode and a second electrode.

Next, specific various voltage waveforms and the like when operating the potential supply circuit 260 having the above-described configuration will be described with reference to FIGS. 19 and 20. A graph in FIG. 19 shows a waveform of a voltage $V_{fup}$ applied to the first electrode 221 and a waveform of a voltage $V_{fdown}$ applied to the second electrode 222 when the compensation voltage CV is 0 V. FIG. 19 also shows a potential difference ($V_{fup}$–$V_{fdown}$) between the first electrode 221 and the second electrode 222 when the compensation voltage CV is 0 V, that is, a waveform of the dispersion voltage DV. A horizontal axis of the graph in FIG. 19 is time (unit is "μs"). A vertical axis of the graph in FIG. 19 is a voltage (unit is "V") related to the voltages $V_{fup}$ and $V_{fdown}$ In FIG. 19, in order to show a relationship between a drive state of the transistor 265 and the voltages $V_{fup}$ and $V_{fdown}$ an OFF period during which a low potential is supplied to a gate electrode 265A is denoted by "OFF", and an ON period during which a high potential is supplied to the gate electrode 265A is denoted by "ON".

According to FIG. 19, during the OFF period of the transistor 265, a potential having a negative polarity is applied to the first electrode 221, and a potential having a positive polarity is applied to the second electrode 222. Waveforms of the voltages $V_{fup}$ and $V_{fdown}$ applied to the first electrode 221 and the second electrode 222 during the OFF period are both substantially semi-sinusoidal waves. During the OFF period, an absolute value of a peak value of the voltage $V_{fup}$ is equal to an absolute value of a peak value of the voltage $V_{fdown}$ During the ON period of the transistor 265, a potential having a positive polarity is applied to the first electrode 221, and a potential having a negative polarity is applied to the second electrode 222. Waveforms of the voltages $V_{fup}$ and $V_{fdown}$ applied to the first electrode 221 and the second electrode 222 during the ON period are both substantially rectangular waves. The waveform of the voltage $V_{fup}$ applied to the first electrode 221 and the waveform of the voltage $V_{fdown}$ applied to the second electrode 222 are substantially symmetrical about a horizontal axis (0 V), and their polarities are always opposite to each other. When the compensation voltage CV is 0 V, the voltage $V_{fup}$ applied to the first electrode 221 is a potential obtained by reversing a polarity of a potential obtained by offsetting a power supply voltage V1 (100 V) of a DC power supply 261 from the drain voltage Vd of the transistor 265. When the compensation voltage CV is 0 V, the voltage $V_{fdown}$ applied to the second electrode 222 is the potential obtained by offsetting the power supply voltage V1 of the DC power supply 261 from the drain voltage Vd of the transistor 265. The potential difference ($V_{fup}$–$V_{fdown}$) between the first electrode 221 and the second electrode 222 when the compensation voltage CV is 0 V is about twice the value obtained by offsetting the power supply voltage V1 of the DC power supply 261 from the drain voltage Vd of the transistor 265.

Figure 20:
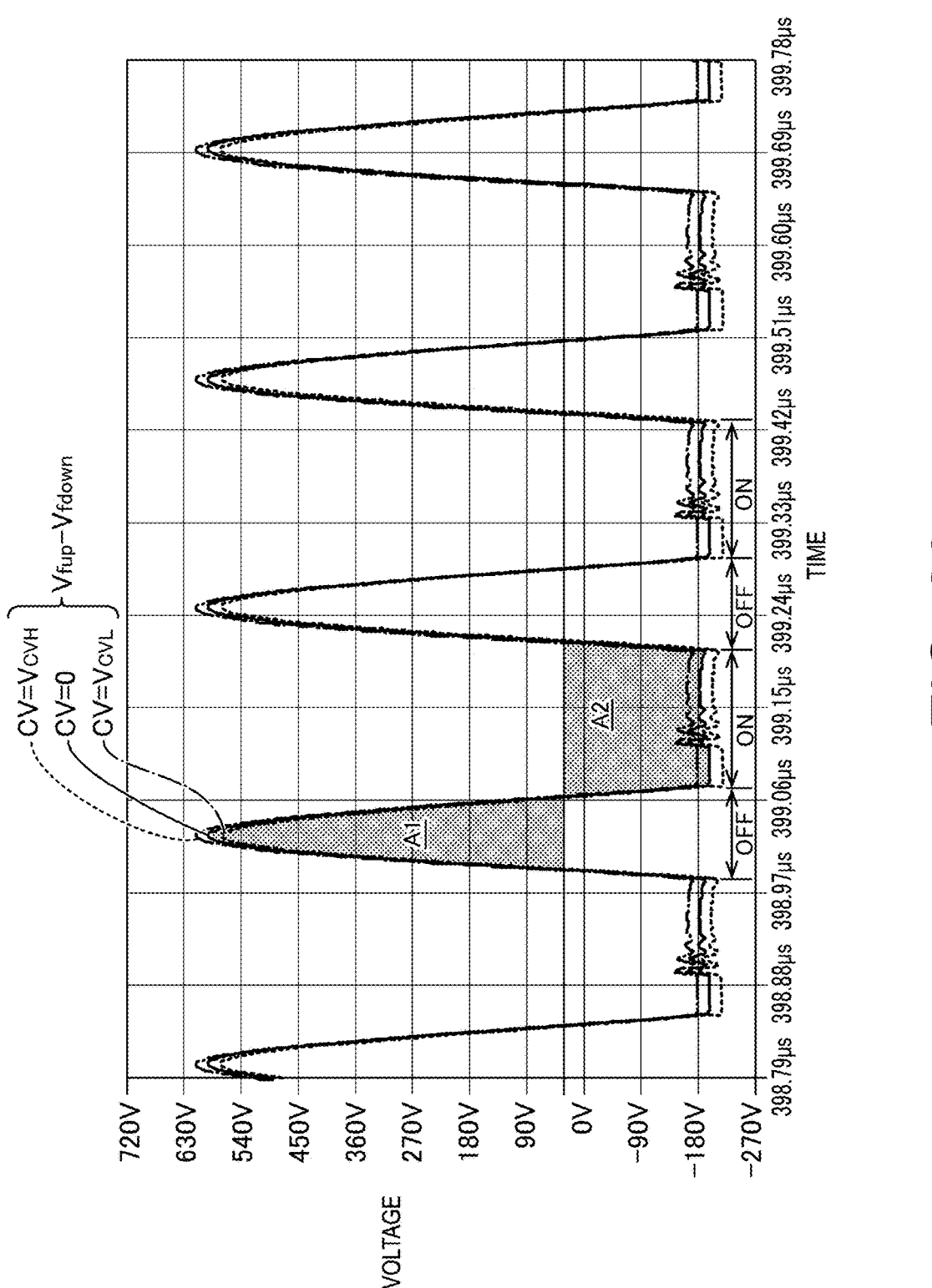
FIG. 20 is a graph showing waveforms of potential differences between the first electrode and the second electrode.

Next, waveforms of the potential difference ($V_{fup}$–$V_{fdown}$) between the first electrode 221 and the second electrode 222 are shown in a graph in FIG. 20. A horizontal axis of the graph in FIG. 20 is time (unit is "μs"). A vertical axis of the graph in FIG. 20 is a voltage (unit is "V") related to the potential difference ($V_{fup}$–$V_{fdown}$). In FIG. 20, in order to show a relationship between a drive state of the transistor 265 and the potential difference ($V_{fup}$–$V_{fdown}$), the OFF period during which the low potential is supplied to the gate electrode 265A is denoted by "OFF", and the ON period during which the high potential is supplied to the gate electrode 265A is denoted by "ON". FIG. 20 shows three representative examples of the potential difference ($V_{fup}$–$V_{fdown}$) between the first electrode 221 and the second electrode 222: when the compensation voltage CV is an upper limit voltage $V_{CVH}$ (+20 V); when the compensation voltage CV is 0 V; and when the compensation voltage CV is a lower limit voltage $V_{CVL}$ (–20 V). When the compensation voltage CV is 0 V, the dispersion voltage DV is equal to the potential difference ($V_{fup}$–$V_{fdown}$).

First, the voltage $V_{fup}$ is applied to the first electrode 221. The voltage $V_{fup}$ is obtained by superimposing the fourth compensation potential supplied from the fourth compensation potential supply section 69 on the potential obtained by reversing the polarity of the potential obtained by offsetting the power supply voltage V1 of the DC power supply 261 from the drain voltage Vd of the transistor 265. The voltage $V_{fdown}$ is applied to the second electrode 222. The voltage $V_{fdown}$ is obtained by superimposing the fifth compensation potential supplied from the fifth compensation potential supply section 70 on the potential obtained by offsetting the power supply voltage V1 of the DC power supply 261 from the drain voltage Vd of the transistor 265. Thus, as shown in FIG. 20, the potential difference ($V_{fup}$–$V_{fdown}$) between the first electrode 221 and the second electrode 222 can be increased to about twice the potential difference ($V_{fup}$–$V_{fdown}$) between the first electrode 21 and the second electrode 22 of the first embodiment described above. Thus, the field intensity of the electrical field generated between the first electrode 221 and the second electrode 222 can also be about twice that of the first embodiment described above. The potential difference ($V_{fup}$–$V_{fdown}$) obtained by superimposing the compensation voltage CV on the dispersion voltage DV is a bipolar pulse voltage that shows both positive and negative polarities, similar to the dispersion voltage DV, and the potentials in both positive and negative polarities are switched asymmetrically. As described above, the high frequency and high voltage potential difference ($V_{fup}$–$V_{fdown}$) can be applied between the first electrode 221 and the second electrode 222 with low power consumption.

As described above, according to the present embodiment, the second input portion 264B1 of the second inductor 264B is connected to the first electrode 221, and the second electrode 222 is connected in parallel to the drain electrode 265C and the resonant circuit 266 with respect to the first output portion 264A2. When the induced electromotive force synchronized with the PWM signal is generated in the second inductor 264B, positive and negative potentials are periodically applied to the first electrode 221 connected to the second input portion 264B1 of the second inductor 264B. To be specific, during the ON period of the PWM signal, a potential having a positive polarity or a negative polarity is applied to the first electrode 221, and during the OFF period of the PWM signal, a potential having a negative polarity or a positive polarity is applied to the first electrode 221. the second electrode 222 is connected in parallel to the drain electrode 265C and the resonant circuit 266 with respect to the first output portion 264A2. Thus, positive and negative potentials are periodically applied to the second electrode 222 based on the drain voltage that fluctuates in synchronization with the PWM signal. To be specific, during the ON period of the PWM signal, a potential having a negative polarity or a positive polarity is applied to the second electrode 222, and during the OFF period of the PWM signal, a potential having a negative polarity or a positive polarity is applied to the second electrode 222. Thus, since the potentials having opposite polarities are applied to the first electrode 221 and the second electrode 222, the potential difference between the first electrode 221 and the second electrode 222 is large. Thus, the field intensity of the electrical field generated between the first electrode 221 and the second electrode 222 can be increased.

The second input portion 264B1 and the first electrode 221 are connected in parallel with respect to the fourth compensation potential supply section 69 that generates the fourth compensation potential, and the second electrode 222 is connected to the fifth compensation potential supply section 70 that generates the fifth compensation potential. The potential obtained by superimposing the fourth compensation potential generated from the fourth compensation potential supply section 69 on the potential based on the induced electromotive force generated in the second inductor 264B is applied to the first electrode 221. The potential obtained by superimposing the fifth compensation potential generated from the fifth compensation potential supply section 70 on the potential based on the return current flowing through the resonant circuit 266 is applied to the second electrode 222. Whether or not charged particles pass through the flow path is controlled according to the fourth compensation potential and the fifth compensation potential.

OTHER EMBODIMENTS

The techniques disclosed in the present specification are not limited to the embodiments described above and illustrated in the drawings, and the following embodiments, for example, are also included within the technical scope.

(1) Specific circuit configurations of the potential supply circuits 60, 160, and 260 can be appropriately changed from the contents illustrated in the drawings. Circuit elements other than those illustrated in the drawings can be added to the potential supply circuits 60, 160, and 260. The circuit elements included in the potential supply circuits 60, 160, and 260 illustrated in the drawings can be changed to other circuit elements. The circuit elements included in the potential supply circuits 60, 160, and 260 illustrated in the drawings can be eliminated.

(2) In the configuration described in the first embodiment, the second input portion 64B1 of the second inductor 64B and the first compensation potential supply section 63 may be connected in parallel to the second electrode 22.

(3) In the configuration described in the first embodiment, the second input portion 64B1 of the second inductor 64B may be connected to the first electrode 21, and the first compensation potential supply section 63 may be connected to the second electrode 22.

(4) In the configuration described in the first embodiment, the second input portion 64B1 of the second inductor 64B may be connected to the second electrode 22, and the first compensation potential supply section 63 may be connected to the first electrode 21.

(5) In the configuration described in the second embodiment, the third input portion 64D1 of the third inductor 64D and the third compensation potential supply section 68 may be connected in parallel to the first electrode 121, and the second input portion 164B1 of the second inductor 164B and the second compensation potential supply section 67 may be connected in parallel to the second electrode 122.

(6) In the configuration described in the third embodiment, the first output portion 264A2, the drain electrode 265C, and the resonant circuit 266 may be coupled to the first electrode 221 via the capacitor C6, and the second input portion 264B1 of the second inductor 264B and the fourth compensation potential supply section 69 may be connected in parallel to the second electrode 222.

(7) In the configuration described in the first embodiment, the specific manner in which the windings of the inductors 64A and 64B are wound around the core 64C can be appropriately changed other than as illustrated in the drawing. Also, in the configuration described in the third embodiment, the specific manner in which the windings of the inductors 264A and 264B are wound around the core 264C can be appropriately changed other than as illustrated in the drawing. For example, the windings of the first inductors 64A and 264A and the windings of the second inductors 64B and 264B may be wound around the cores 64C and 264C so as to overlap each other.

(8) In the configuration described in the second embodiment, the specific manner in which the windings of the inductors 64D, 164A, and 164B are wound around the core 164C can be appropriately changed other than as illustrated in the drawing. For example, the winding of the first inductor 164A, the winding of the second inductor 164B, and the winding of the third inductor 64D may be wound around the core 164C so as to overlap each other.

(9) The dispersion voltage DV may be supplied to each of the first electrode 21, 121, and 221, and the compensation voltage CV may be supplied to each of the second electrode 22, 122, and 222. To be specific, the voltage $V_{flip}$ applied to each of the first electrode 21, 121, and 221 is the dispersion voltage DV calculated by offsetting the power supply voltage V1 of each of the DC power supply 61, 161, and 261 from the drain voltage Vd. On the other hand, the voltage applied to each of the second electrode 22, 122, and 222 is the compensation voltage CV.

(10) Contrary to (9) above, the dispersion voltage DV may be supplied to each of the second electrode 22, 122, and 222 and the compensation voltage CV may be supplied to each of the first electrode 21, 121, and 221.

(11) In the configuration described in the first embodiment, both the first inductor 64A and the second inductor 64B may be wound clockwise around the core 64C.

(12) In the configuration described in the first embodiment, the winding direction of the first inductor 64A around the core 64C may be opposite to the winding direction of the second inductor 64B around the core 64C. To be specific, when the first inductor 64A is wound counterclockwise around the core 64C, the second inductor 64B may be wound clockwise around the core 64C. When the first inductor 64A is wound clockwise around the core 64C, the second inductor 64B may be wound counterclockwise around the core 64C.

(13) In the configuration described in the second embodiment, all of the first inductor 164A, the second inductor 164B, and the third inductor 64D may be wound clockwise around the core 164C.

(14) In the configuration described in the second embodiment, the winding direction of the first inductor 164A around the core 164C may be opposite to the winding direction of the second inductor 164B around the core 164C and the winding direction of the third inductor 64D around the core 164C. To be specific, when the first inductor 164A is wound counterclockwise around the core 164C, the second inductor 164B and the third inductor 64D may be wound clockwise around the core 164C. When the first inductor 164A is wound clockwise around the core 164C, the second inductor 164B and the third inductor 64D may be wound counterclockwise around the core 164C.

(15) In the configuration described in the third embodiment, the first inductor 264A may be wound clockwise around the core 264C, and the second inductor 264B may be wound counterclockwise around the core 264C.

(16) In the configuration described in the third embodiment, the winding direction of the first inductor 264A around the core 264C may be the same as the winding direction of the second inductor 264B around the core 264C. To be specific, both the first inductor 264A and the second inductor 264B may be wound counterclockwise around the core 264C. Alternatively, both the first inductor 264A and the second inductor 264B may be wound clockwise around the core 264C.

(17) In the configurations described in the first and third embodiments, the number of turns of each of the first inductors 64A and 264A around the cores 64C and 264C may be different from the number of turns of each of the second inductors 64B and 264B around the cores 64C and 264C. The voltage $V_{flip}$ can be further amplified by adjusting a ratio between the number of turns of each of the first inductors 64A and 264A and the number of turns of each of the second inductors 64B and 264B.

(18) In the configuration described in the second embodiment, some or all of the number of turns of the first inductor 164A around the core 164C, the number of turns of the second inductor 164B around the core 164C, and the number of turns of the third inductor 64D around the core 164C may be different. The voltage $V_{flip}$ can be further amplified by adjusting the number of turns of the first inductor 164A, the number of turns of the second inductor 164B, and the number of turns of the third inductor 64D.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A detector comprising:
   a first electrode;
   a second electrode facing the first electrode with a space therebetween and forming a flow path for charged particles as objects to be detected between the first electrode and the second electrode;

a third electrode arranged side-by-side with the second electrode on a downstream side in the flow path with respect to the second electrode and configured to collect the charged particles; and a potential supply circuit configured to supply a potential to at least one of the first electrode and the second electrode, wherein:

the potential supply circuit includes a first inductor, including a first input portion and a first output portion, and a second inductor including a second input portion and a second output portion, the first inductor not being connected to the first electrode or the second electrode, the first input portion of the first inductor is connected to a DC power supply, and the DC power supply is not connected to the second inductor, and the second input portion of the second inductor is connected to the first electrode or the second electrode.

2. The detector according to claim 1, wherein the potential supply circuit further includes a transistor and a resonant circuit, the transistor includes a gate electrode, a source electrode, and a drain electrode, the gate electrode is connected to a pulse width modulation (PWM) signal supply section configured to generate a PWM signal, and the drain electrode and the resonant circuit are connected in parallel with respect to the first output portion.

3. The detector according to claim 2, wherein the second input portion of the second inductor is connected to the first electrode.

4. The detector according to claim 3, wherein the second input portion and the first electrode are connected in parallel with respect to a first compensation potential supply section configured to generate a first compensation potential.

5. The detector according to claim 2, further comprising:

a third inductor including a third input portion and a third output portion; and a core having an annular shape around which the first inductor, the second inductor, and the third inductor are wound, wherein:

a winding direction of the second inductor, with respect to the core from the second input portion to the second output portion, is the same as a winding direction of the third inductor, with respect to the core from the third output portion to the third input portion, the second input portion of the second inductor is connected to the first electrode, and the third input portion of the third inductor is connected to the second electrode.

6. The detector according to claim 5, wherein the second input portion and the first electrode are connected in parallel with respect to a first compensation potential supply section configured to generate a first compensation potential, and the third input portion and the second electrode are connected in parallel with respect to a second compensation potential supply section configured to generate a second compensation potential.

7. The detector according to claim 2, wherein the second input portion of the second inductor is connected to the first electrode, and the second electrode is connected in parallel to the drain electrode and the resonant circuit with respect to the first output portion.

8. The detector according to claim 7, wherein the second input portion and the first electrode are connected in parallel with respect to a first compensation potential supply section configured to generate a first compensation potential, and the second electrode is connected to a second compensation potential supply section configured to generate a second compensation potential.

* * * * *